(12) United States Patent
Brodersen et al.

(10) Patent No.: US 7,930,650 B2
(45) Date of Patent: Apr. 19, 2011

(54) USER INTERFACE WITH MENU ABSTRACTIONS AND CONTENT ABSTRACTIONS

(75) Inventors: Rainer Brodersen, San Jose, CA (US); Rachel Clare Goldeen, Mountain View, CA (US); Jeffrey Ma, Redwood City, CA (US); Mihnea Calin Pacurariu, Los Gratos, CA (US); Eric Taylor Seymour, San Jose, CA (US); Jeff Robbin, Los Altos, CA (US); Thomas Michael Madden, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/530,834

(22) Filed: Sep. 11, 2006

(65) Prior Publication Data

US 2008/0066010 A1    Mar. 13, 2008

(51) Int. Cl.
*G06F 3/048* (2006.01)
(52) U.S. Cl. .................... 715/838; 715/810; 715/836
(58) Field of Classification Search .................. 715/802, 715/810, 838, 841, 859, 860, 861, 864, 821, 715/836, 767; 345/640
See application file for complete search history.

(56) References Cited

U.S. PATENT DOCUMENTS

| | | | |
|---|---|---|---|
| 5,619,249 A | 4/1997 | Billock et al. | |
| 5,717,879 A | 2/1998 | Moran et al. | |
| 5,822,123 A | 10/1998 | Davis et al. | |
| 5,880,768 A | 3/1999 | Lemmons et al. | |
| 6,006,227 A | 12/1999 | Freeman et al. | |
| 6,335,737 B1 | 1/2002 | Grossman et al. | |
| 6,448,987 B1* | 9/2002 | Easty et al. | 715/834 |
| 6,638,313 B1 | 10/2003 | Freeman et al. | |
| 6,725,427 B2 | 4/2004 | Freeman et al. | |
| 6,768,999 B2 | 7/2004 | Prager et al. | |
| 6,944,632 B2 | 9/2005 | Stern | |
| 7,292,243 B1 | 11/2007 | Burke | |
| 7,362,331 B2 | 4/2008 | Ording | |
| 7,363,591 B2* | 4/2008 | Goldthwaite et al. | 715/763 |
| 2002/0033848 A1 | 3/2002 | Sciammarella et al. | |
| 2002/0083469 A1 | 6/2002 | Jeannin et al. | |
| 2002/0175931 A1 | 11/2002 | Holtz et al. | |
| 2003/0110450 A1 | 6/2003 | Sakai | |
| 2003/0117425 A1 | 6/2003 | O'Leary et al. | |
| 2003/0142751 A1 | 7/2003 | Hannuksela | |
| 2003/0174160 A1 | 9/2003 | Deutscher et al. | |
| 2004/0008211 A1 | 1/2004 | Soden et al. | |
| 2004/0100479 A1* | 5/2004 | Nakano et al. | 345/700 |

(Continued)

FOREIGN PATENT DOCUMENTS

EP    1 469 375 A1    10/2004

(Continued)

OTHER PUBLICATIONS

U.S. Appl. No. 11/530,824, filed Sep. 11, 2006, Madden et al.

(Continued)

*Primary Examiner* — Dennis-Doon Chow
*Assistant Examiner* — Rashawn Tillery
(74) *Attorney, Agent, or Firm* — Fish & Richardson P.C.

(57) ABSTRACT

Media menu items are generated within a media interface environment. Media menu item abstractions are generated, one of the media menu item abstractions arranged in a foreground position, and one or more of the media menu item abstractions arranged in background positions in the media interface environment. Selection of a media menu items transitions to a corresponding content menu interface.

36 Claims, 18 Drawing Sheets

U.S. PATENT DOCUMENTS

| | | | |
|---|---|---|---|
| 2004/0140995 A1 | 7/2004 | Goldthwaite et al. | |
| 2004/0150657 A1 | 8/2004 | Wittenburg et al. | |
| 2004/0221243 A1* | 11/2004 | Twerdahl et al. | 715/834 |
| 2004/0250217 A1* | 12/2004 | Tojo et al. | 715/810 |
| 2004/0261031 A1 | 12/2004 | Tuomainen et al. | |
| 2005/0041033 A1 | 2/2005 | Hilts | |
| 2005/0044499 A1 | 2/2005 | Allen et al. | |
| 2005/0091597 A1 | 4/2005 | Ackley | |
| 2005/0154988 A1* | 7/2005 | Proehl et al. | 715/720 |
| 2005/0160375 A1 | 7/2005 | Sciammarella et al. | |
| 2005/0246654 A1* | 11/2005 | Hally et al. | 715/779 |
| 2005/0278656 A1* | 12/2005 | Goldthwaite et al. | 715/810 |
| 2006/0020962 A1 | 1/2006 | Stark et al. | |
| 2006/0031776 A1* | 2/2006 | Glein et al. | 715/779 |
| 2006/0265409 A1 | 11/2006 | Neumann et al. | |
| 2007/0162853 A1* | 7/2007 | Weber et al. | 715/719 |
| 2007/0288863 A1 | 12/2007 | Ording et al. | |
| 2008/0062894 A1 | 3/2008 | Ma et al. | |
| 2008/0065638 A1 | 3/2008 | Brodersen et al. | |
| 2008/0065720 A1 | 3/2008 | Brodersen et al. | |
| 2008/0066013 A1 | 3/2008 | Brodersen et al. | |
| 2008/0066110 A1 | 3/2008 | Brodersen et al. | |
| 2008/0092168 A1 | 4/2008 | Logan et al. | |
| 2008/0122870 A1 | 5/2008 | Brodersen et al. | |

FOREIGN PATENT DOCUMENTS

| | | | |
|---|---|---|---|
| EP | 1 510 911 A2 | 3/2005 | |

OTHER PUBLICATIONS

"Fading Image Rollovers," http://web.archive.org/web/20060111080357/http://www.javascript-fx.com/fade_rollovers/general_help/help.html. Jan. 11, 2006, 1 page.

"Animated Image Blur," http://web.archive.org/web/20060430062528/http://www.tutorio.com/tutorial/animated-image-blur, Apr. 30, 2006, 2 pages.

* cited by examiner

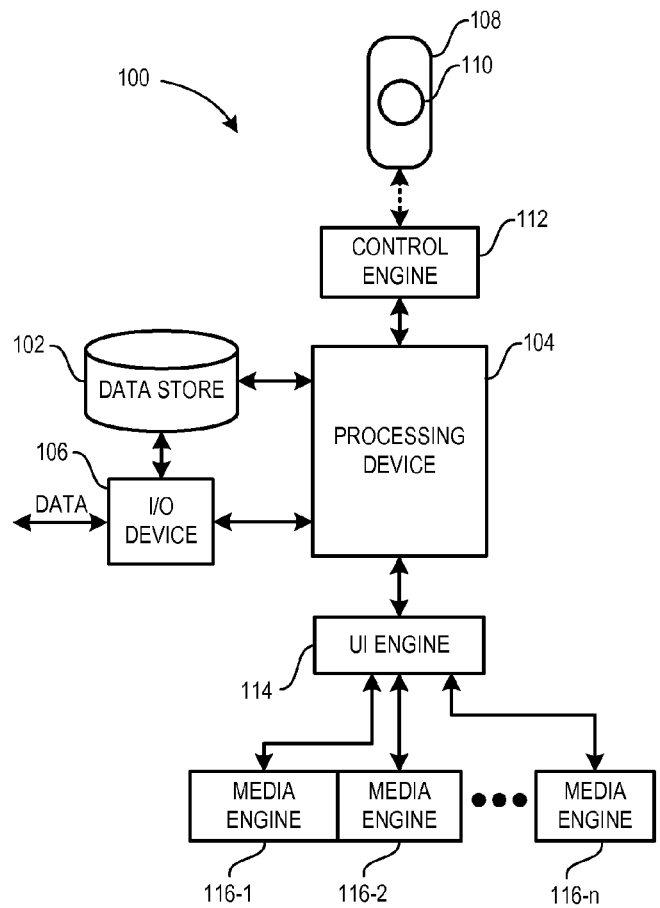
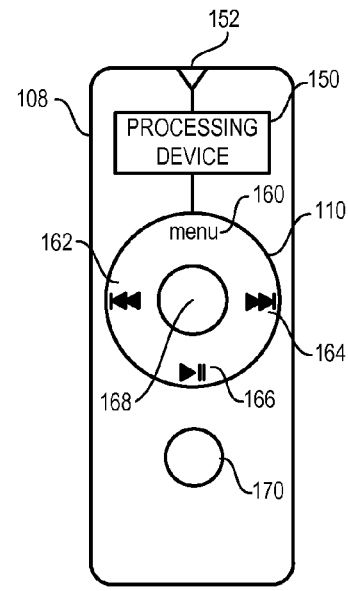
FIG. 1          FIG. 2
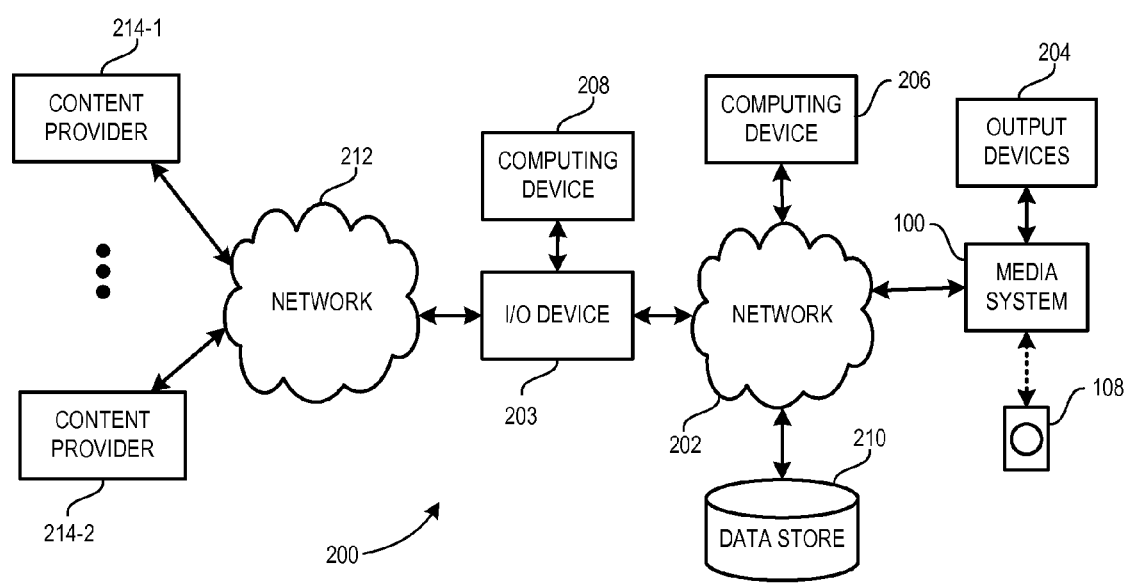
FIG. 3

USER INTERFACE WITH MENU ABSTRACTIONS AND CONTENT ABSTRACTIONS

BACKGROUND

This disclosure is related to media processing systems and methods.

Media devices, such as digital video and audio platers, can include multiple functions and capabilities, such as playing stored content, browsing and selecting from recorded content, storing and/or receiving content selected by a user, and the like. These various functions can often be grouped according to content types, e.g., movies, music, television programs, photos, etc. The functions can then be accessed through various user interfaces are accessible. The user arranged in a hierarchical manner, having a "root" or "home" user interface at the top of the hierarchy, from which the various context-dependent user interfaces are accessible. The user interfaces can include both graphical and textual features. It is desirable that the user interface conveys information to the user in an intuitive manner, and readily provides access to various functions.

SUMMARY

Disclosed herein are systems and methods for processing a media user interface. In one example implementation, a media menu interface comprising a plurality of media menu items is generated. One or more of the media menu items can be highlighted. A plurality of media menu item abstractions corresponding to the media menu items is generated, and the media men item abstractions are arranged so that a media menu item abstraction corresponding to a highlighted media menu item is displayed in a foreground position. The media menu item abstractions that do not correspond to the highlighted media menu item are arranged in background positions.

In another example implementation, a computer readable medium stores instructions that are executable by a processing device. Upon execution of the instructions, the processing device generates a home interface environment, and generates a home MENU within the home interface environment. The home menu comprises a plurality of home menu items. The processing device also generates a plurality home menu item abstractions, and one of the home menu item abstractions is arranged in a foreground position while the remaining home menu item abstractions are arranged in background positions in the home interface environment. The foreground positions and background positions define a multidimensional path extending from a terminus.

BRIEF DESCRIPTION OF THE DRAWINGS

FIG. 1 is a block digram of an example media processing system.

FIG. 2 is a block diagram of an example remote control device for the media processing system.

FIG. 3 is an example network environment in which a media processing system in accordance with FIG. 1 may be implemented.

DETAILED DESCRIPTION

Figure 4:
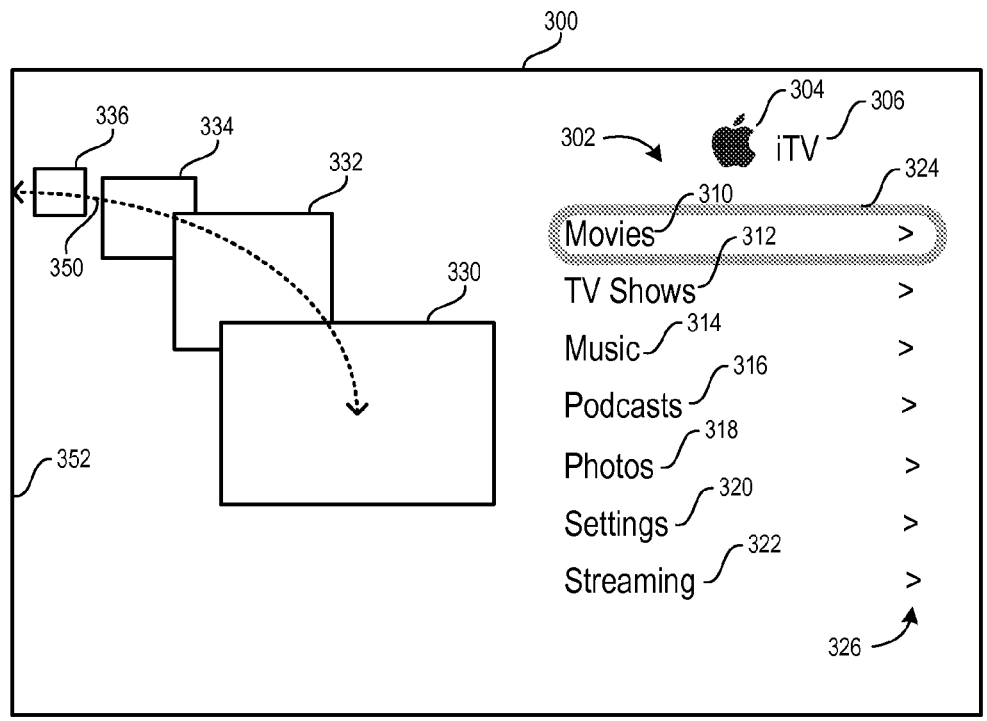
FIG. 4 is a block diagram of an example media menu interface environment.

FIG. 1 is a block diagram of an example media processing system 100. The media processing system 100 can transmit and receive media data and data related to the media data. The media data can be stored in a data store 102, such as a memory device, and be processed by a processing device 104 for output on a display device, such as a television, a computer monitor, a game console, a hand held portable device, and the like, and/or an audio device, such as a multi-channel sound system, a portable media player, a computer system, and the like. The media processing system 100 may be used to process media data, for example, video data and audio data received over one or more networks by an input//output (I/O) device 106. Such media data may include metadata, e.g., song information related to audio data received, or programming information related to a television program received.

The media data and related metadata may be provided by a single provider, or may be provided by separate providers. In one implementation, the media processing system 100 can be configured to receive media data from a first provider over a first network, such as a cable network, and receive metadata related to the video data from a second provider over a second network, such as a wide area network (WAN). Example media data include video data, audio data, content payload data, or other data conveying audio, textural and/or video data.

In another implementation, the media processing system 100 can be configured to receive media data and metadata from a computing device, such as a personal computer. In one example of this implementation, a user manges one or more media access accounts with one or more content providers through the personal computer. For example, a user may manage a personal iTunes® account with iTunes® software, available from Apple Computer, Inc. Media data, such as audio and video media data, can be purchased by the user and stored on the user's personal computer and/or one or more data stores. The media data and metadata stored on the personal computer and/or the one or more data stores can be selectively pushed and/or pulled for storage in the data store 102 of the media processing system 100.

In another implementation, the media processing system 100 can be used to process media data stored in several data stores in communication with a network, such as wired and/or wireless local area network (LAN), for example. In one implementation, the media processing system 100 can pull and/or receive pushed media data and metadata from the data stores over the network for presentation to a user. For example, the media processing system 100 may be implemented as part of an audio and video entertainment center having a video display device and an audio output device, and can pull media data and receive pushed media data from one or more data stores for storage and processing. At the entertainment center, a use can, for example, view photographs that are stored on a first computer while listening to music files that are stored on a second computer.

In one implementation, the media processing system 100 includes a remote control device 108. The remote control device 108 can include a rotational input device 110 configured to sense touch actuations and generate remote control signals therefrom. The touch actuations can include rotational actuations, such as when a user touches the rotational input device 110 with a digit and rotates the digit on the surface of the rotational input device 110. The touch actuations can also include click actuations, such as when a user presses on the rotational input device 110 with enough pressure to cause the remote control device 108 to sense a click actuation.

In one implementation, the functionality of the media processing system 100 is distributed across several engines. For example, the media processing system 100 may include a controller engine 112, a user interface (UI) engine 114, and one or more media engines 116-1, 116-2, and 116-i n. The engines may be implemented in software as software modules or instructions, or may be implemented in hardware, or in a combination of software and hardware.

The control engine 112 is configured to communicate with the remote control device 108 by a line, such as a wireless infrared signal or radio frequency signal. The remote control device 108 can transmit remote control signals generated, for example, from touch actuations of the rotational input device 110 to the control engine 112 over the link. In response, the control engine 112 is configured to receive the remote control signals and generate control signals in response. The control signals are provided to the processing device 104 for processing.

The control signals generated by the control engine 112 and processed by the processing device 104 can invoke one or more of the UI engine 114 and media engines 116-1-116*n*. In one implementation, the UI engine 114 manges a user interface to facilitate data presentation for the media engines 116-1-116*n* and functional processing in response to user inputs.

In one implementation, the media engines 116 can include one or more content-specific engines, such as a movies engine, television program engine, music engine, and the like. Each engine 116 can be instantiated to support content-specific functional processing. For example, a movie engine to support movie-related functions can be instantiated by selecting a "Movies" menu item. Example movie-related functions include purchasing movies, viewing movie previews, viewing movies stored in a user library, and the like. Likewise, a music engine to support music-related functions can be instantiated by selecting a "Music" menu item. Example music-related functions include purchasing music, viewing music playlists, playing music stored in a user library, and the like.

The media processing system 100 of FIG. 1 can also implement different functional distribution architectures that have additional functional blocks or fewer functional blocks. For example, the engines 116 can be implemented in a single-monolithic engine.

FIG. 2 is a block diagram of an example remote control device 108 for the media processing system 100. The remote control device 108 includes a rotational input device 110, a processing device 150, and a wireless communication subsystem 152. The rotational input device 110 defines a surface that can sense a touch actuation, such as the presence of a finger on the surface, and can further generate a control signal based on a rotation of the finer on the surface. In one implementation, a touch sensitive array is disposed beneath the surface of the rotational input device 110. The touch sensitive array can be disposed according to polar coordinates, i.e., r and Θ, or can be disposed according to Cartesian coordinates i.e., x and y.

The rotational input device areas 160, 162, 164, 164, 166 and 168 are receptive to press actuation. In one implementation, the areas include a menu include a menu area 160, a reverse/previous area 162, a play/pause area 164, a forward/next area 166, and a select area 168. The areas 160-168, in addition to generating signals related to their descriptive functionalities, can also generate signals for context-dependent functionality. For example, the menu area 160 can generate signals to support the functionality of dismissing an onscreen user interface, and the play/pause area 164 can generate signals to support the function of drilling down into a hierarchical user interface. In one implementation, the areas 160-168 comprise buttons disposed beneath the surface of the rotational input device 10. In another implementation, the areas 160-168 comprise pressure sensitive actuators disposed beneath the surface of the rotational input device 110.

The processing device 150 is configured to receive the signals generated by the rotational input device 110 and generate corresponding remote control signals in response. The remote control signals can be provided to the communication subsystem 152, which can wirelessly transmit the remote control signals to the media processing system 100.

Although shown as comprising a circular surface, in another implementation, the rotational input device 110 an comprise a rectangular surface, a square surface, or some other shaped surface. Other surface geometries that accommodate pressure sensitive areas and that can sense touch actuations may also be used, e.g., an oblong area, an octagonal area, etc.

Other actuation area configurations may also be used. For example, in another implementation, the remote control device 108 can also include a separate actuation button 170. In this implementation, the areas comprise a "+" or increase area 160, a reverse/previous area 162, a "−" or decrease area 164, a forward/next area 166, a play/pause area 168, and a menu area 170.

FIG. 3 is an example network environment 200 in which a media processing system 100 in accordance with FIG. 2 may be implemented. The media processing system 100 receives, for example, user input through a remote control device 108 and media data over a network 202, such as a wired or wireless LAN. In one implementation, the network 202 communicates with a wide area network 212, such as the Internet, through an I/O device 203, such as a router, server, cable modem, or other computing and/or communication processing device. The media processing system 100 processes the media data for output to one or more output devices 204. The media processing system 100 can receive the media data from one or more data stores connected to the network 202, such as computing devices 206 and 208, and a data store 210.

The media data can be received through the network 212 by one of the computing devices, such as computing device 208. The network 212 can include one or more wired and wireless networks, such as the Internet. The media data is provided by one or more content providers 214. For example, the content provider 214-1 may provide media data that is processed by the media processing system 100 and output through the output devices 206, and the content provider 214-2 may provide metadata related to the media data for processing by the media processing system 100. Such metadata may include episodic content, artist information, and the like. A content provider 214 can also provide both media data and related metadata.

In one implementation, the media processing system 100 can also communicate with one or more content providers 214 directly. For example, the media processing system 100 can communicate with the content providers the wireless network 202, the I/O device 203, and the network 121. The media processing system 100 can also communicate with the content providers 214 through other network configuration, e.g., through a direct connection to a cable modem, through a router, or through one or more other communication devices. Example communication can include receiving sales information, preview information, or communications related to commercial transactions, such as purchasing audio files and video files.

In another implementation, the media processing system 100 can receive content from any of the computing devices 206 and 208, and other such computing devices or data stores 210 available on the network 202 through sharing. Thus, if any one or more of the computing devices or data stores are unavailable, media data and /or metadata one the remaining computing devices or other such computing devices or data stores can still be accessed.

FIG. 4 is a block diagram of an example media menu interface environment 300. The example media menu interface environment 300 provides a menu interface from which one or more of a plurality of content-specific menus and corresponding functions may be selected.

In one implementation, the media menu interface environment 300 includes a media menu 302 identified in part by an icon 304 in a title location and a title 306, e.g., "iTv." The media menu 302 includes media menu items 310, 312, 314, 316, 318, 320 and 322, respectively entitled "Movies, " "TV Shows, " "Music," "Pdcasts, " "Photos," "Setting," and "Streaming." The media menu 302 can also include a highlight indicator 324 that highlights a media menu item. In one implementation, the highlight indicator 324 is a graphical indicator that provides the effect of a diffused backlighting, e.g., a glow highlight that provides the appearance of a backlit surface beneath the highlighted menu item.

A highlight selection of a menu item by the highlight indicator 324 indicates that the menu item is eligible for a further selection action, e.g., eligible to be selected by actuating the select area 168 on the rotational input device 110. The highlight indicator 324 can be moved vertically, for example, by actuating menu area 160 and the play/pause area 164 on the rotational input device 110.

Upon the further selection, a process associated with the highlighted menu item is performed. In one implementation, selection of the media menu item 310 when highlighted generates a movie content menu environment for processing media data related to movies, such as movie previews and full-length movies. Selection of the media menu item 312 when highlighted generates a TV Shows content menu environment for processing media data related to television programs, such as program episodes. Selection of the media menu item 314 when highlighted generates a Music content menu environment for processing media data related to music, such as audio files and music video files. Selection of the media menu item 316 when highlighted generates a Podcasts content menu environment for processing media data related to podcasts. Selection of the media menu item 318 when highlighted generates a Photos content menu environment for processing media data related to photos, such as photographs and videos. Selection of the media menu item 320 when highlighted generates a settings menu environment for changing settings of the media system, such as setting restrictions and shard files. Selection of the media menu item 322 when highlighted generates a Streaming menu environment or identifying and selecting media data stored on data stores or computer devices accessible through a network, such as media data stored on computing devices 206 and 208 and data store 210 and accessible over the network 202 of FIG. 2.

The media menu 302 can also include a child indicator 326 associated with a media menu item. The child indicator 326 indicates that tone or more sub-menus or sub-items, e.g., folder, will become available or will be accessed upon selection of the corresponding media menu item.

The media menu interface environment 300 also includes media menu item abstractions that correspond to one or more of the media menu items. For example, the media menu item abstractions 330, 332, 334 and 336 correspond to media menu items 310, 312, 314 and 316, respectively. In one implementation, the media menu item abstractions are graphical representations of the content of corresponding media menu items. For example, the media menu item abstraction 330, which corresponds to the Movies media menu item 310, can be a movie icon. Likewise, the media menu item abstraction 332, which corresponds to the TV Shows media menu item 312, can be a television icon; the media menu item abstraction 334, which corresponds to the Music media menu item 314, can be a music icon, etc.

In one implementation, the media menu item abstraction 330-336 are arranged such that at least one of the media menu item abstractions, e.g., icon 330, is in a foreground position, and the remaining the media menu item abstractions, e.g., icons 332-336, are in one or more background positions. The foreground and background positions define a multidimensional path 350, and the media menu item abstraction 336 is in a background position that defines a terminus of the multidimensional path. In one implementation, the terminus is at the edge 352 of the media menu interface environment 300.

In one implementation, the media menu item abstraction corresponding to a highlighted menu is displaced in the foreground position. For example, in FIG. 4, the media menu item abstraction 330, which corresponds to the highlighted Movies media menu item 310, is displayed in the foreground position.

In another implementation, one or more of the media menu item abstractions in the background positions may be displayed with an effect, e.g., a blurring effect. The blurring effect can be used to further deemphasize the media menu item abstractions. For example, in FIG. 4, the media menu items 332-336 can be blurred. In another implementation, a media item abstraction is blurred to a degree substantially or functionally proportional to the proximity of the media menu item abstraction to the foreground position. For example, the media menu item abstraction 336 can be extremely blurred, while the media menu item abstraction 332 can be only slightly out of focus.

In another implementation, media menu item abstractions are scaled in size, for example, substantially or functionally proportionally to the proximity of the media menu item abstraction to the foreground position. For example, the media menu item abstraction 336 can be displayed at approximately 20% of full scale, and the media menu item abstraction 30 can be displayed at 100% of full scale.

In one implementation, changing the position of the highlight indicator 324 causes the highlight indicator to transition from a highlighted media menu item to a media menu item to be highlighted, e.g., an adjacent media menu item. The transition of the highlight indicator 324 likewise causes the media menu item abstractions to transition between the foreground and background positions along the multidimensional path 350 until the media menu item abstraction corresponding to the newly-highlighted media menu item is in the foreground position.

Figure 5:
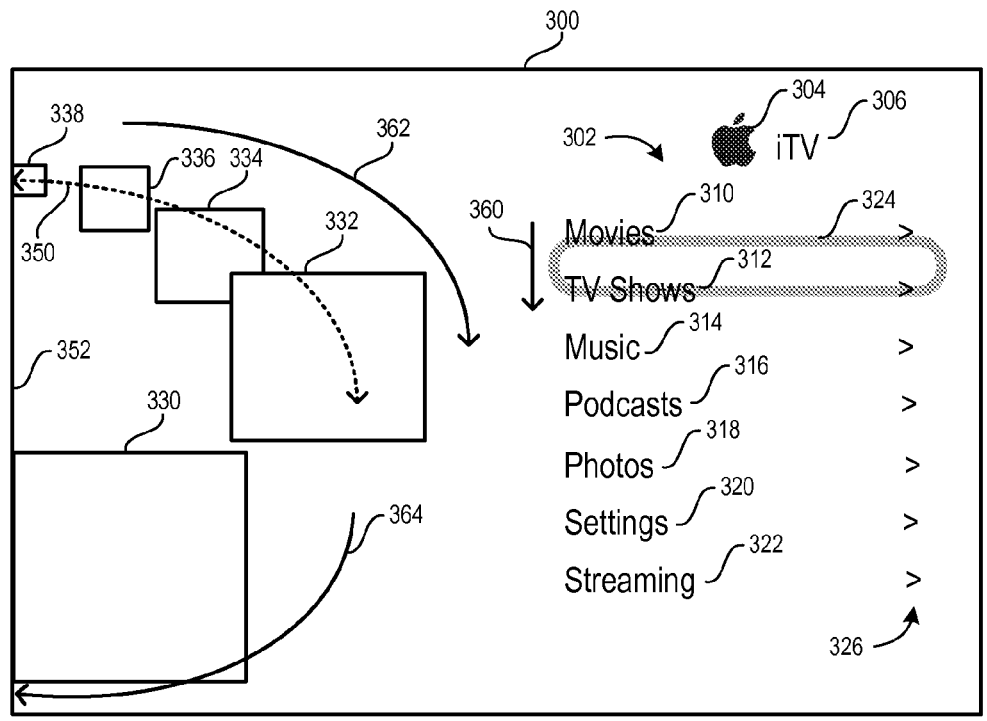
FIGS. 5 and 6 are block diagrams of an example transition of media menu item abstractions in the media menu interface environment.
Figure 6:
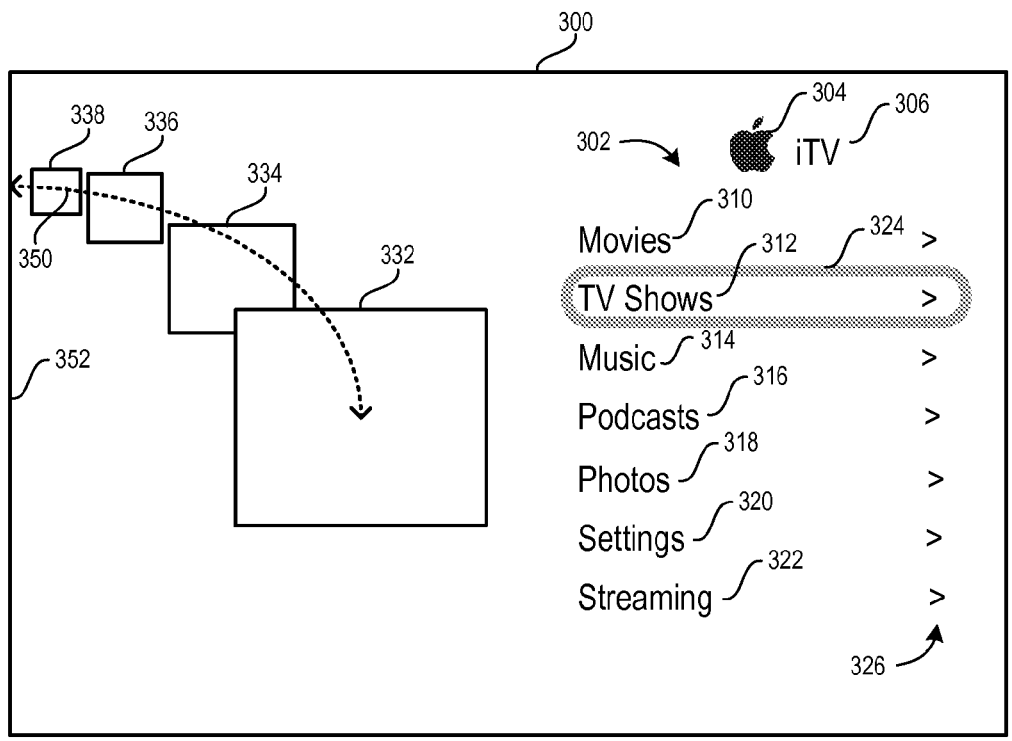

FIGS. 5 and 6 are block diagram of an example transition of media menu item abstractions in the media menu interface environment 300. In FIG. 5, the highlight indicator 324 is transitioned from media menu item 310 to media menu item 312, as indicated by the directional arrow 360. In response, the media menu item abstractions 332, 334 and 336 transition along the multidimensional path 350, as indicated by the direction arrow 362. As the media menu item abstraction 336 transition out of the terminus position, another media menu item abstraction 338, which corresponds to the Photos media menu item 318, emerges into the terminus position. In this implementation, the media menu item abstraction 338 emerges from the edge 352 of the media menu interface environment 300.

Because the media menu item abstraction 332 is transitioning from a background position into the foreground position previously occupied by media menu item abstraction 330, the media menu item abstraction 330 transitions out of the media menu interface environment 300, as indicated by directional arrow 364. In the example implementation shown in FIG. 5, the media menu item abstraction 330 transitions off the edge 352 of the media menu interface environment 300.

In one implementation, the scale of the media menu item abstraction transitioning off the edge 352 of the media menu interface environment 300 can be increased to simulate a "fly-by" effect. For example, the scale of the media menu item abstraction 330 can be proportionally increased form 100% to 150% of full scale as the media menu item abstraction 330 transitions from the foreground position to the edge 352 of the media menu interface environment 300.

FIG. 6 is a block diagram of the end result of the transition of the menu abstractions in the media menu interface environment 300. The arrangement of the media menu item abstractions in the similar to that of FIG. 4, except that the media menu item abstraction 332 is now in the foreground position and the media menu item abstractions 334, 336 and 338 are in the background positions. Likewise, the TV Shows media menu item 312, which corresponds to the media menu item abstraction 332 in the foreground position, is now highlighted by the highlight indicator 32.

Figure 7:
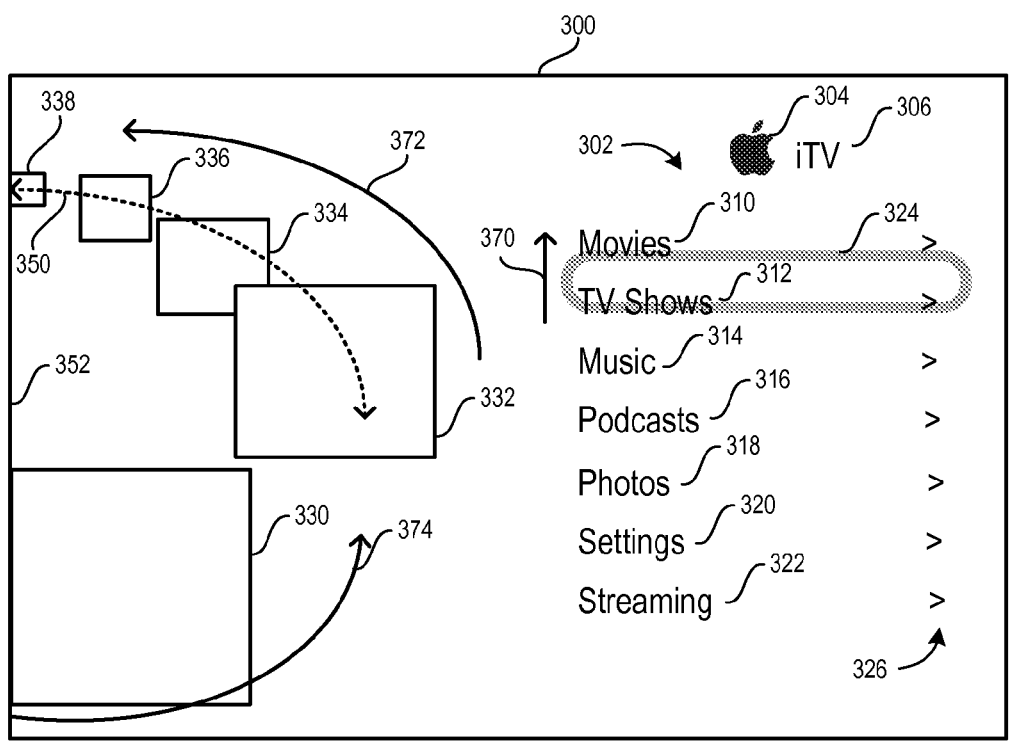
FIG. 7 is a block diagram of another example transition of media menu item abstractions in the media menu interface environment.

FIG. 7 is a block diagram of another example transition of media menu item abstractions in the media menu interface environment 300. In FIG. 7, the highlight indicator 324 is transitioned from media menu item 312 to media menu item 310, as indicated by the directional arrow 370. In response, the media menu item abstractions 332, 334, 336 and 338 transition along the multidimensional path 350, as indicated by the directional arrow 372. During this transition, the media menu item abstraction 332 also transitions from a foreground position to a background position, and the media menu item abstraction 338 transitions from the terminus position out of the media menu interface environment 300 through the edge 352. As the media menu item abstraction 338 transitions out the terminus position, another media menu item abstraction 336, which corresponds to the Podcasts media menu item 316, emerges into the terminus position.

The media menu item abstraction 330, which corresponds to the Movies menu item 310 which is to be highlighted by the highlight indicator 324, emerges from the edge 352 and back into the foreground position, as indicated by the directional arrow 374. In the example implementation shown in FIG. 7, the media menu item abstraction 330 emerges from the edge 352 of the media menu interface environment at an increased scale to simulate a "fly by" effect. For example, the scale of the media menu item abstraction 330 can be proportionally decreased from 150% to 100% of full scale as the media menu item abstraction 330 transitions from the edge 352 of the media menu interface environment 300 to the foreground position.

One the transitions indicated by the directional arrows 370, 372 and 374 are complete, the media menu interface environment 300 returns to the state as depicted in FIG. 4.

Figure 8:
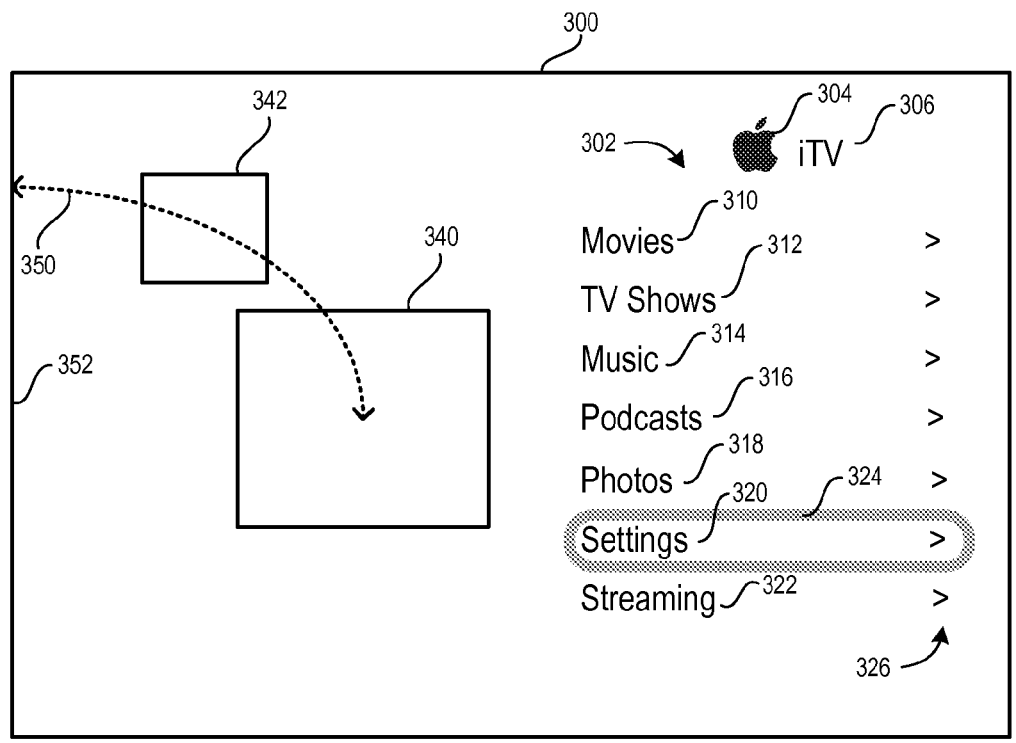
FIG. 8 is a block diagram of an example display of media menu item abstractions based on a selected menu item.

FIG. 8 is a block diagram of an example display of media menu item abstractions based one a selected menu item 320. In this example implementation, the highlight indicator 324 can transition vertically between media menu items 310 and 322, but does not wrap between media menu items 310 and 322. Thus to return the highlight indicator 324 to the media menu item 310, the highlight indicator 324 must transition through the media menu items 318, 316, 314 and 312. The media menu item abstractions 340 and 342 transition through the multidimensional path in a similar manner. For example, transitioning the highlight indicator 324 to the Streaming media menu item 322 will cause the media menu item abstraction 340 to transition out of the media menu interface environment 300 through the edge 352, and cause the media menu item abstraction 342 to transition from the background position into the foreground position. In the example implementation of FIG. 8, the highlight indicator 324 cannot transition beyond the Streaming media menu item 322, and thus additional media menu item abstractions do not transition into the terminus position.

Likewise, transitioning the highlight indicator 324 to the photos media menu item 318 will cause the media menu item abstraction 340 to transition into a background position and the media menu item abstraction 342 to transition further into the background positions, and will also cause the media menu item abstraction 338 to emerge into the foreground position.

Figure 9:
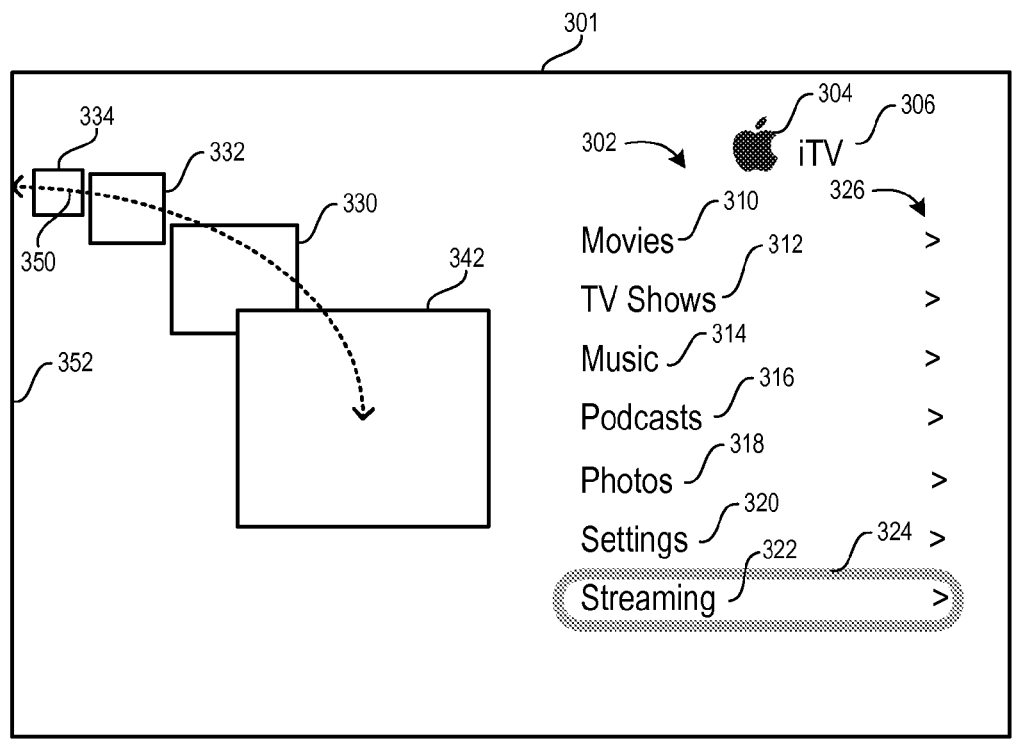
FIG. 9 is a block diagram of another example media menu interface environment.

FIG. 9 is a block diagram of another example media menu interface environment 301. In this example implementation, the highlight indicator 324 can transition vertically between media menu items 310 and 322, and can wrap between media menu items 310 and 322. Thus, to return the highlight indicator 324 to the media menu item 310, the highlight indicator 324 can transition out of the bottom of the media menu 302 and reappear at the top of the media menu 302, beneath the item 304. The media menu item abstraction 342 thus transitions out of the media menu interface environment 301. Additionally, the media menu item abstractions 330, 332 and 334 transition through the background positions, and the media menu item abstraction 336 emerges from the edge 352 into the terminus position.

Figure 10:
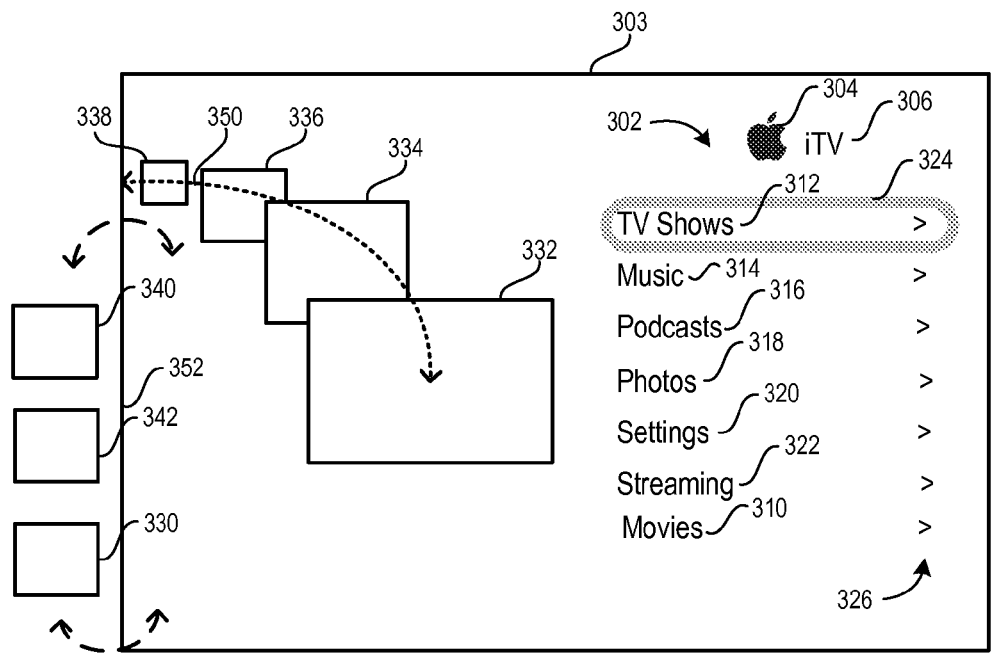
FIG. 10 is a block diagram of another example media menu interface environment.

FIG. 10 is a block diagram of another example media menu interface environment 303. In this example implementation, the highlight indicator 324 is stationary, and the media menu items 310-322 vertically wrap in an up or down direction in response to a command to change a highlighted media menu item. The media menu items 330-342 likewise transition in a corresponding manner, similar to the transitions described with respect to FIG. 9 above. As shown in FIG. 10, the TV Shows media menu item 312 is highlighted, and thus the media menu item abstractions 332, 334, 336 and 338 are arranged in the foreground and background positions as indicated. The remaining media menu item abstractions 340, 342 and 330 can emerge into the media menu interface environment 303 in corresponding order, depending on the direction in which the media menu items 310-322 are scrolled.

Figure 11:
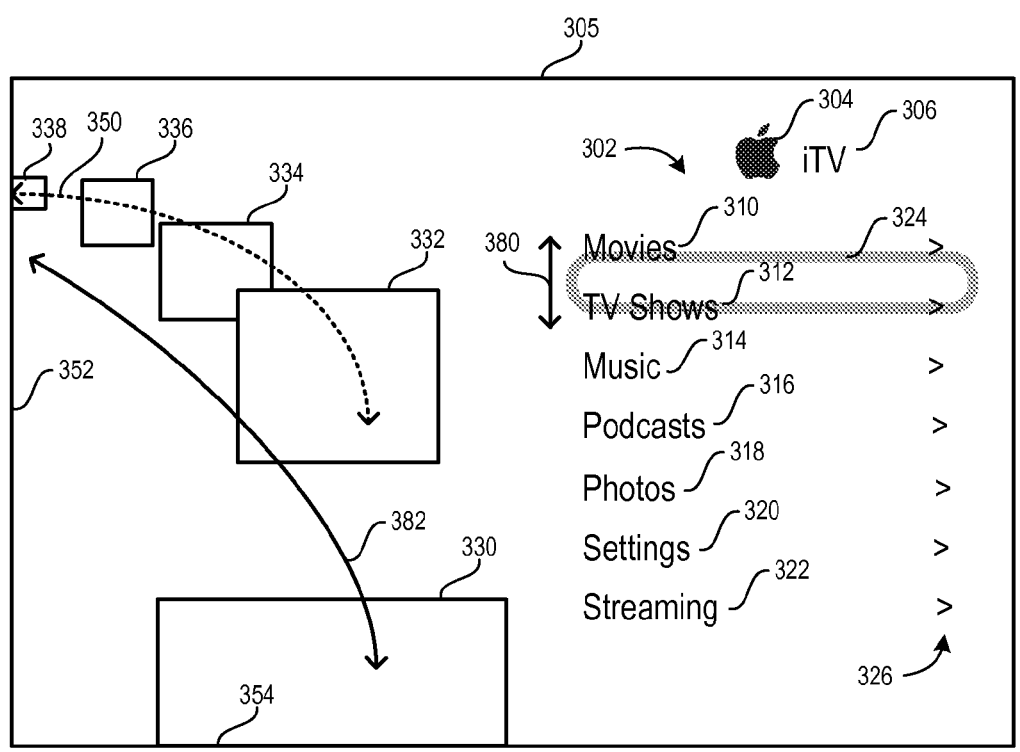
FIG. 11 is a block diagram of another example transition of media menu item abstractions in the media menu interface environment.

FIG. 11 is a block diagram of another example media menu interface environment 305. The example implementation of FIG. 11 can transition the media menu item abstractions 330-342 in a similar manner as described with reference to FIGS. 4-9, however, the media menu item abstractions 330-342 transition out the menu interface environment 305 through another edge 354.

Other processes can be implemented to illustrate a transition of a media menu item abstraction out of the media menu interface environment. For example, in one implementation, a media menu item abstraction is increased in size and fades out, simulating an effect of vertically launching from the media menu interface environment. In another implementation, a media menu item abstractions follows a straight path, or a linear path, from the foreground position out of the media menu interface environment. Other visual effects can also be used.

Figure 12:
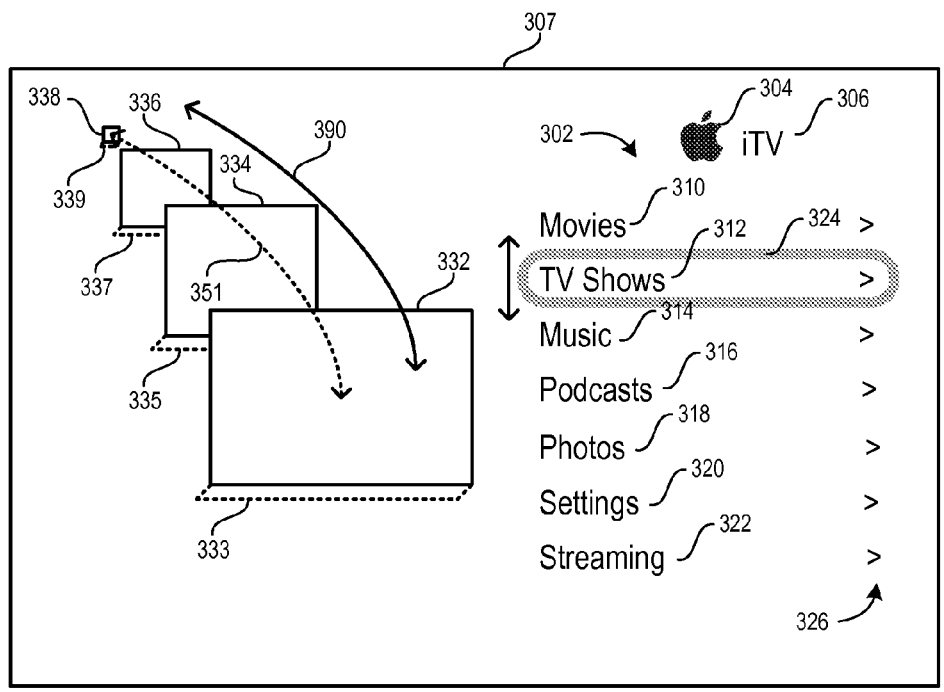
FIG. 12 is a block diagram of another example media menu interface environment.

FIG. 12 is a block diagram of another example media menu interface environment 307. In the example media menu interface environment 307, the media menu item abstractions are arranged in foreground and background positions, and one of the background positions is near a terminus of a multidimensional path 351. The terminus is defined by a vanishing point, and the media menu item abstractions emerge into the menu interface environment 307 from the vanishing point when the media menu item abstractions are transitioning from the background positions into the foreground positions, and transition out of the menu interface environment 307 at the vanishing point when the media menu item abstractions are transitioning from the foreground position into the background positions, as indicated by directional arrow 390.

In another implementation, the media menu item abstractions can include a reflection effect. For example, the media menu item abstractions 332, 334, 336 and 338 include reflections 333, 335, 337 and 339. The reflection effect further emphasizes a multidimensional visual effect, and can be implemented in any of the implementations described herein.

In another implementation, the number of media menu item abstractions displayed along the multidimensional path 350 can vary depending on the size of the media menu item abstractions. For example, the media processing system 100 may normally display four media menu item abstractions; however, if the media menu item abstractions are increased or decreased in display size, the number of media menu item abstractions to be displayed can be decreased or increased, respectively.

In the example implementations described above, the transitioning of the media menu item abstractions corresponds to the transitioning of the highlight indicator 324, e.g., as the highlight indicator 324 transitions from one media menu item to the next, the media menu item abstractions likewise transition through the multidimensional path 350 in a substantially synchronous manner.

In another implementation, the media menu item abstractions do not transition until the highlight indicator 324 has settled on a media menu item and no further commands to transition the highlight indicator 324 are received. In yet another implantation, the media menu item abstractions and the highlight indicator 324 transition substantially instantaneously, e.g., within several video frames or within one video frame. Other transition animations may also be used.

Figure 13:
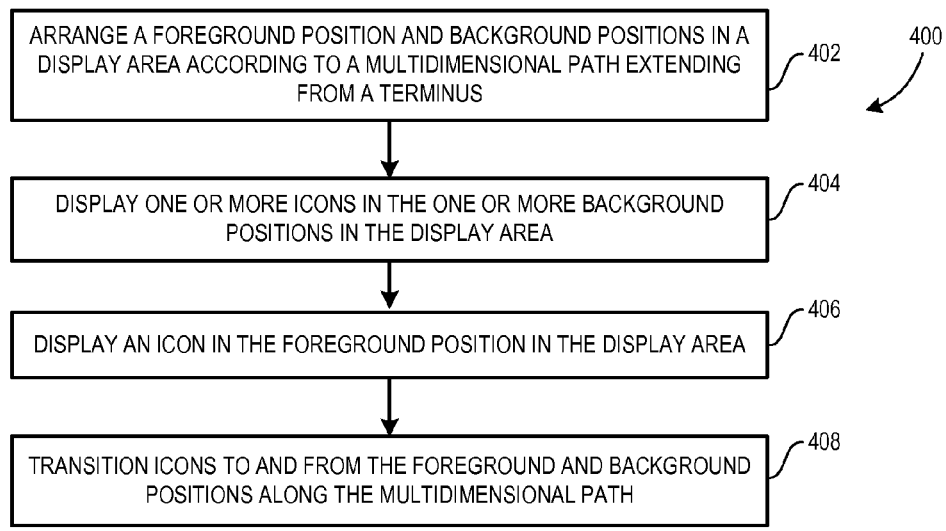
FIG. 13 is a flow diagram of an example icon display process.

FIG. 13 is a flow diagram of an example icon display process 400. In one example implementation, the processing device 104 and/or UI engine 114 can perform operations to implement the process 400.

Stage 402 arranges a foreground position and background positions in a display area according to a multidimensional path extending from a terminus. For example, the processing device 104 and/or UI engine 114 can arrange the media menu item abstractions according to the multidimensional path 350 of FIG. 4 or the multidimensional path 351 of FIG. 12.

Stage 404 displays one or more icons in the one or more background positions in the display area. For example, the processing device 104 and/or UI engine 114 can display one or more media menu item abstractions in one or more background positions.

Stage 406 displays an icon in the foreground position in the display area. For example, the processing device 104 and/or UI engine 114 can display one or more media menu item abstractions, e.g., media icons in foreground positions.

Stage 408 transitions icons from the foreground and background positions along the multidimensional path. For example, the processing device 104 and/or UI engine 114 can transition the media menu item abstractions as described with reference to FIGS. 4-12 above.

Figure 14:
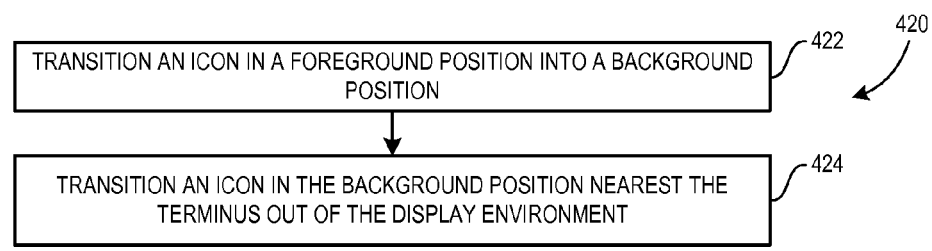
FIG. 14 is a flow diagram of an example icon transition process.

FIG. 14 is a flow diagram of an example icon transition process 420. In one example implementation, the processing device 104 and/or UI engine 114 can perform operations to implement the process 420.

State 422 transitions an icon in the foreground position into a background position. Fore example, the processing device 104 and/or UI engine 114 can transition a media menu item abstraction from a foreground position to a background position.

Stage 424 transitions an icon the background position nearest the terminus of the multidimensional path out of the display environment. For example, the processing device 104 and/or UI engine 114 can transition media menu item abstractions in the terminus position out of the display environment.

Figure 15:
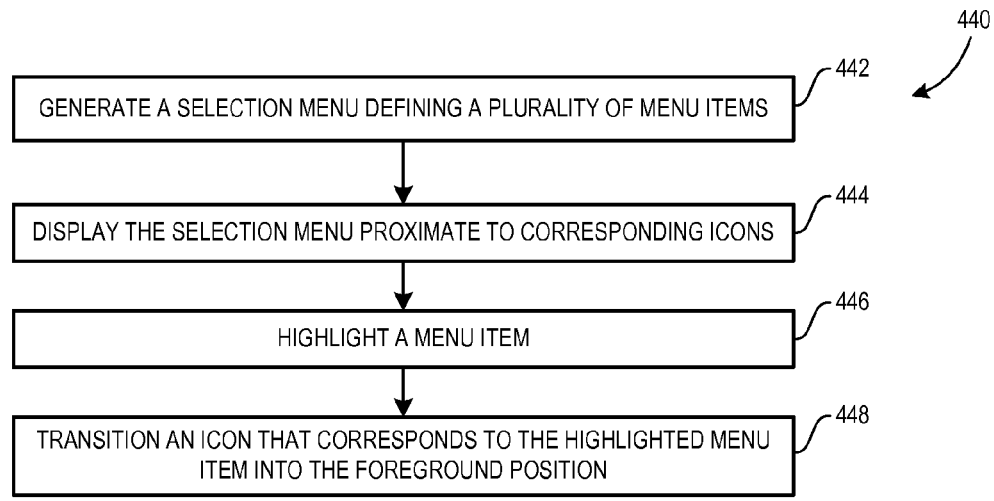
FIG. 15 is a flow diagram of another example icon transition process.

FIG. 15 is a flow diagram of another example icon transition process 440. In one example implementation, the processing device 104 and/or UI engine 114 can perform operations to implement the process 440.

Stage 442 generates a selection menu defining a plurality of menu items. For example, the processing device 104 and/or UI engine 114 can generate the media menu 302 and media menu items 310-322.

Stage 444 displays the selection menu proximate to corresponding icons. For example, the processing device 104 and/or UI engine 114 can display the media menu 302 proximate to the media menu item abstractions 330-342.

Stage 446 highlights a menu item. For example, the processing device 104 and/or UI engine 114 can generate the highlight indicator 324 to highlight a menu item.

Stage 448 transitions an icon that corresponds to the highlighted menu item into the foreground position. Fore example, the processing device 104 and/or UI engine 114 can transition a media menu item abstraction into the foreground position.

Figure 16:
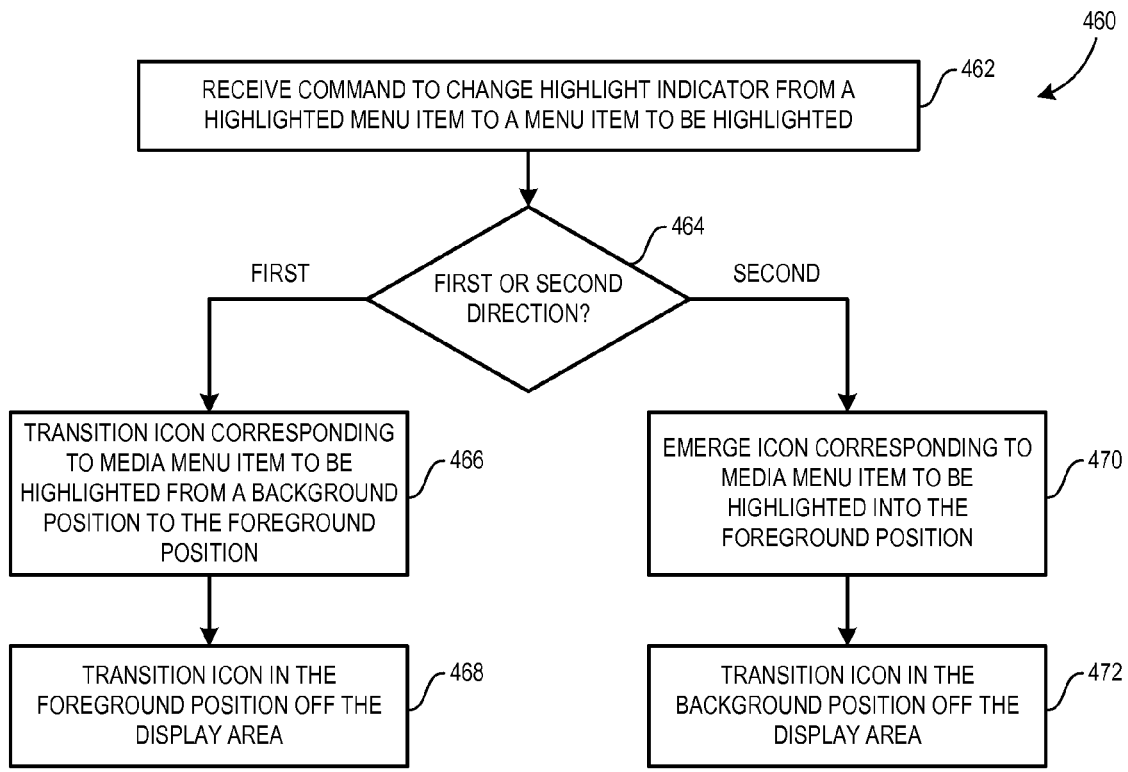
FIG. 16 is a flow diagram of another example icon transition process.

FIG. 16 is a flow diagram of another example icon transition process 460. In one example implementation, the processing device 104 and/or UI engine 114 can perform operations to implement the process 460.

Stage 462 receives a command to change the highlight indicator from a highlighted menu item to a menu item to be highlighted. For example, the processing device 104 and/or UI engine 114 can receive a command to change the highlight indicator 324 from a highlighted media menu item to a media menu item to be highlighted.

Stage 464 determines if the direction of the highlight indicator during transition is in a first direction or a second direction. For example, the processing device 104 and/or UI engine 114 can determine if the highlight indicator 324 is transitioning in an up direction or a down direction. While an example two direction methods is described, other multi-directional methods for traversing more or less complicated paths can be used.

If the direction is in the first direction, stage 466 transitions the icon corresponding to the media menu item to be highlighted from a background position to the foreground position. For example, the processing device 104 and/or UI engine 114 can transition a media menu item abstraction from a background position to a foreground position.

If the direction is in the first direction, stage 468 transitions the highlighted icon in the foreground position off the display area. For example, the processing device 104 and/or UI engine 114 can transition a highlighted media menu item abstraction off the media menu interface environment 300.

If the direction is in the second direction, stage 470 emerges the icon corresponding to the media menu item to be highlighted into the foreground position. For example, the processing device 104 and/or UI engine 114 can emerge a media menu item abstraction into the foreground position.

If the direction is in the second direction, stage 472 transition an icon in the background position off the display area. For example, the processing device 104 and /or UI engine 114 can transition a media menu item abstraction in the terminus position off the media menu interface environment 300.

Figure 17:
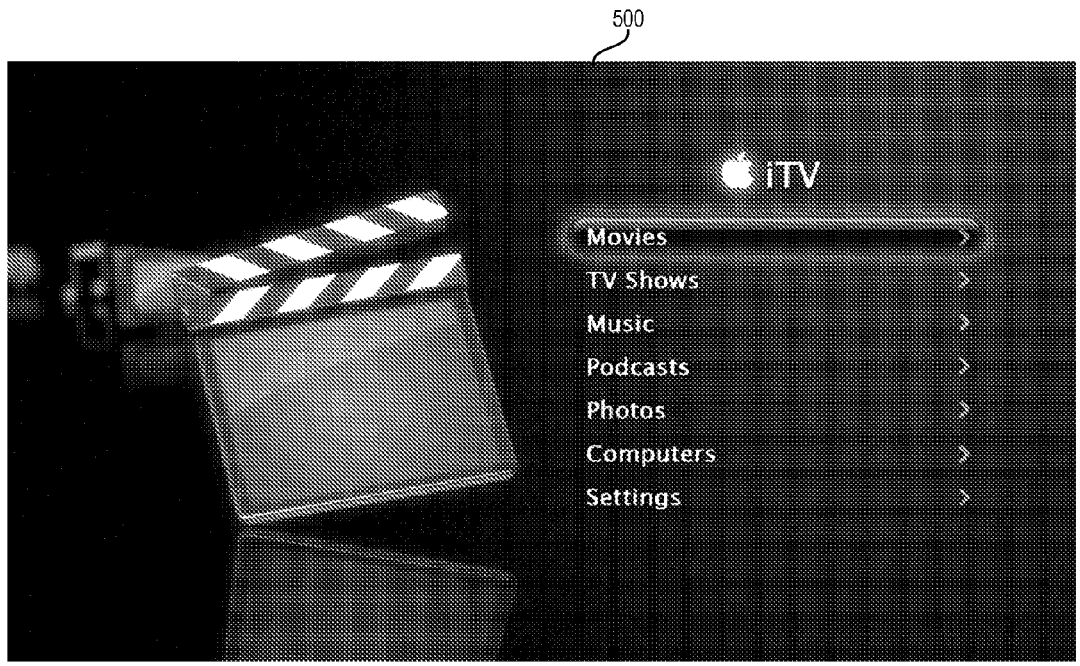
FIG. 17-20 are screenshots of another example media menu interface environment.

FIGS. 17-20 are screenshots of another example media menu interface environment. The screenshot 502 of FIG. 17 shows the "Movies" menu item highlighted by a highlight indicator. A corresponding Movie icon is displayed in a foreground position, and other menu-related icons are blurred in the background positions. Each displayed icon also has a reflection depicted.

Figure 18:
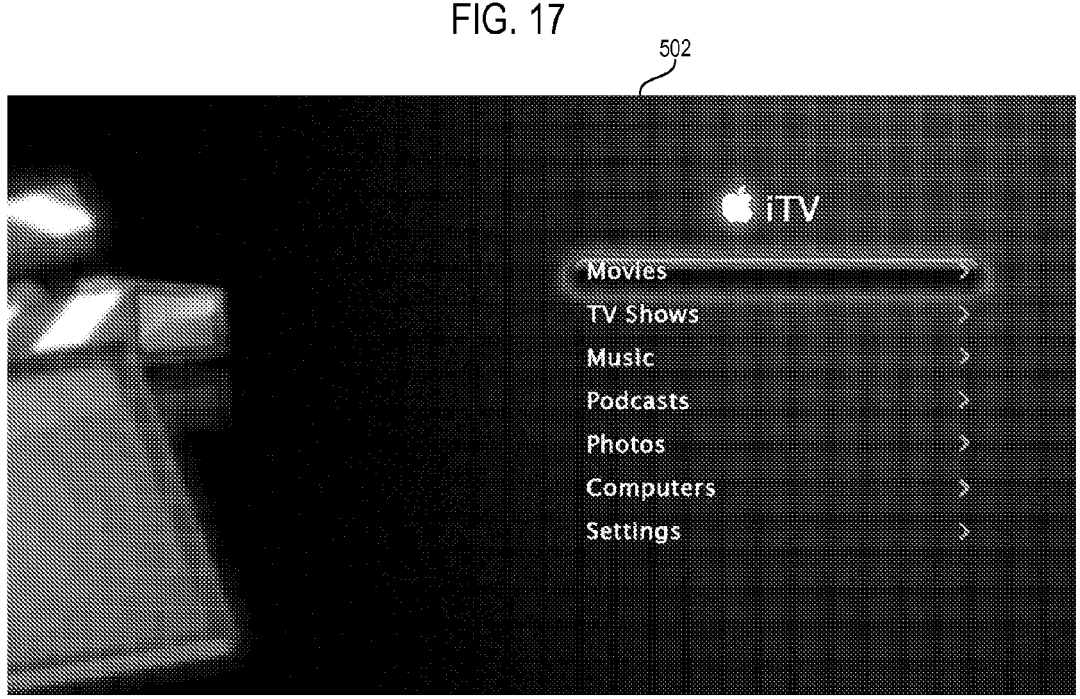
Figure 19:
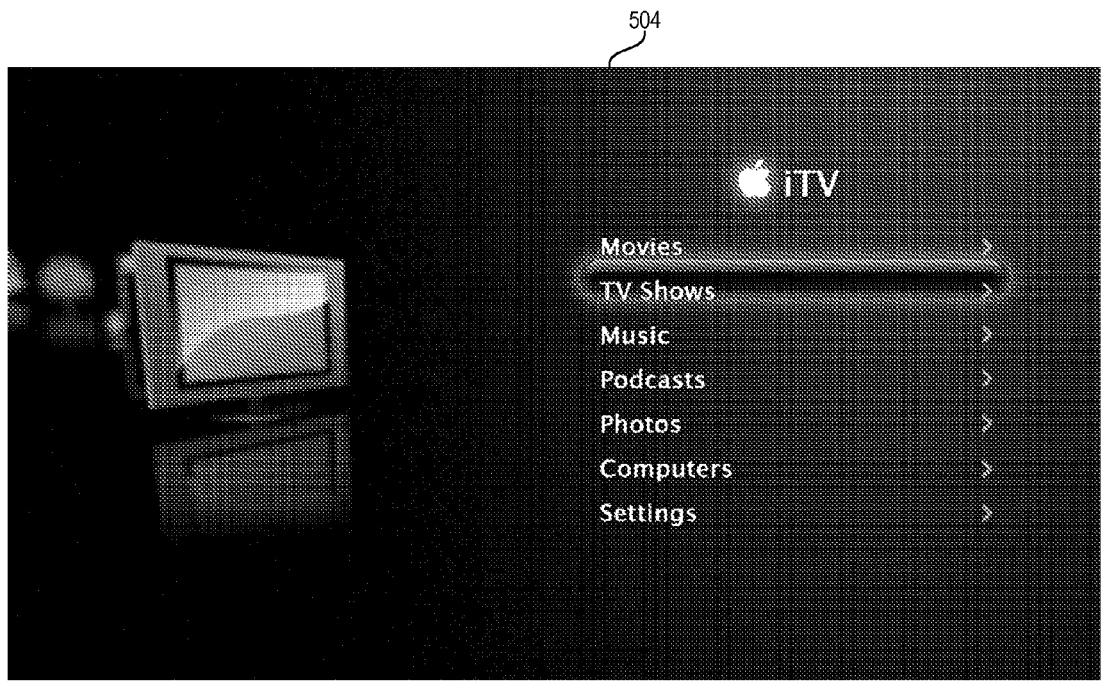

The screenshots 502 and 504 of FIGS. 18 and 19 show two separate frames during a transition of the highlight indicator from the "Movies" menu item to the "TV Shows" menu item. As the highlight indicator transitions, the Movie icon transitions off the edge of the interface environment, and the background icons transition in a forward direction, with the TV Shows icon transitioning into the foreground position.

Figure 20:
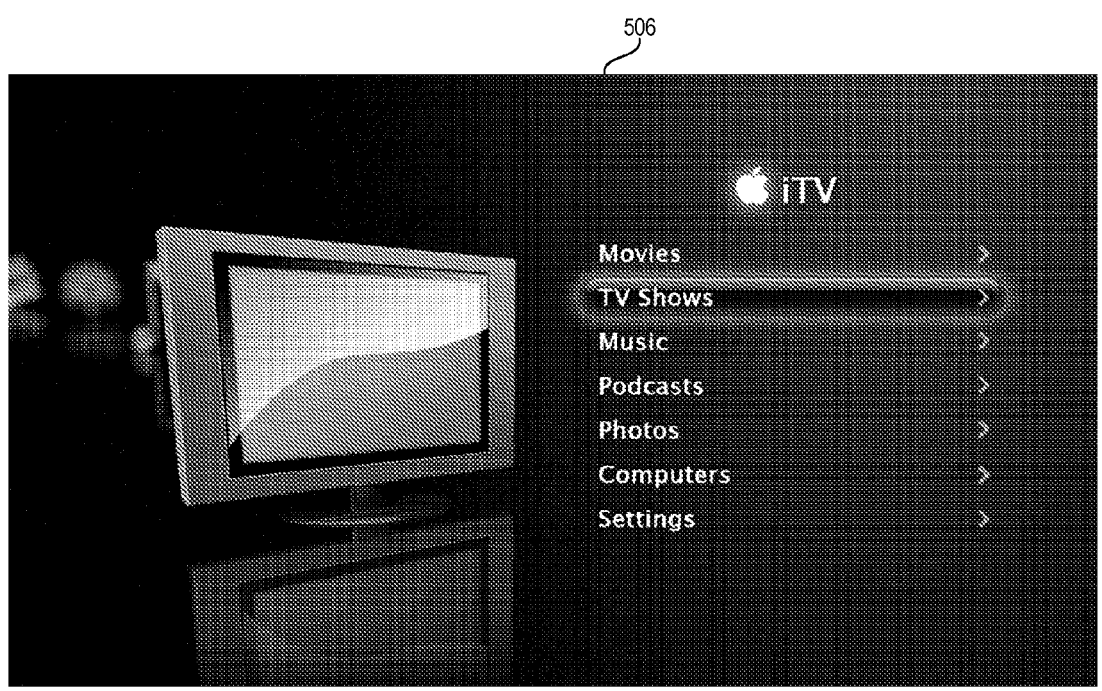

The screenshot 506 of FIG. 20 shows the end result of the transition. The "TV shows" menu item highlighted by a highlight indicator and the corresponding TV Shows icon is displayed in the foreground position.

In another implementation, only one media menu item abstraction is shown in the foreground position, and additional media menu item abstractions are not shown in the background position. In this implementation, the media menu item abstractions that to do not correspond to the highlighted menu item transition off the display area through the multidimensional path as described above, e.g., through the terminus position if transitioning into the background position, or by being displayed by a media menu item abstraction emerging into the terminus position and transitioning from the background into the foreground position. Accordingly, only the media menu item abstraction corresponding to the highlighted menu item is shown.

Figure 21:
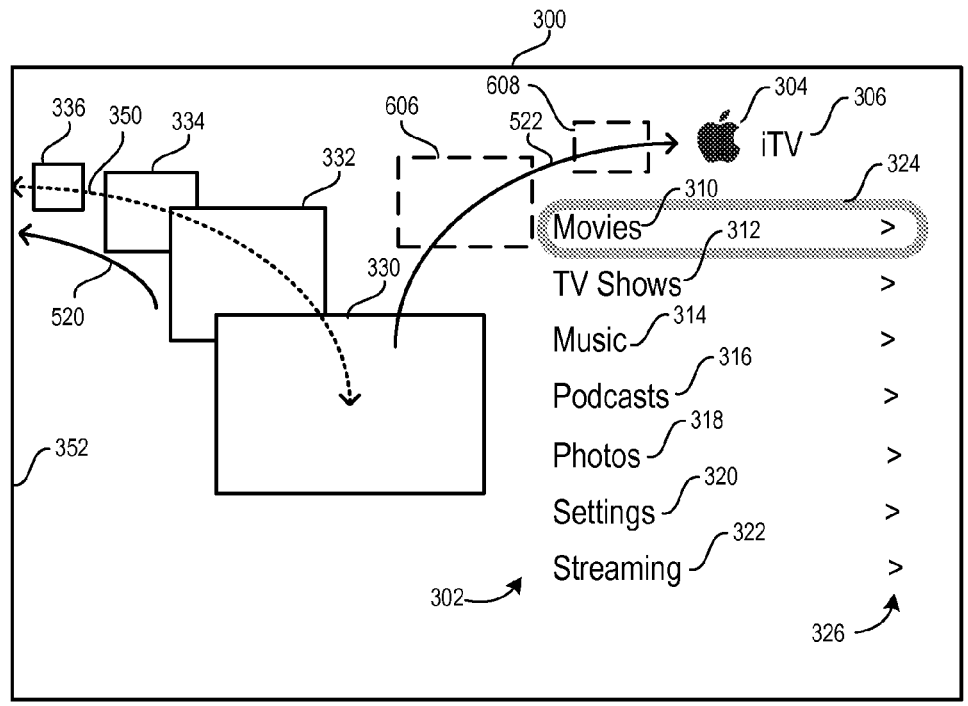
FIGS. 21 and 22 are block digrams of an example transition from the media menu interface environment to a content menu interface environment.
Figure 22:
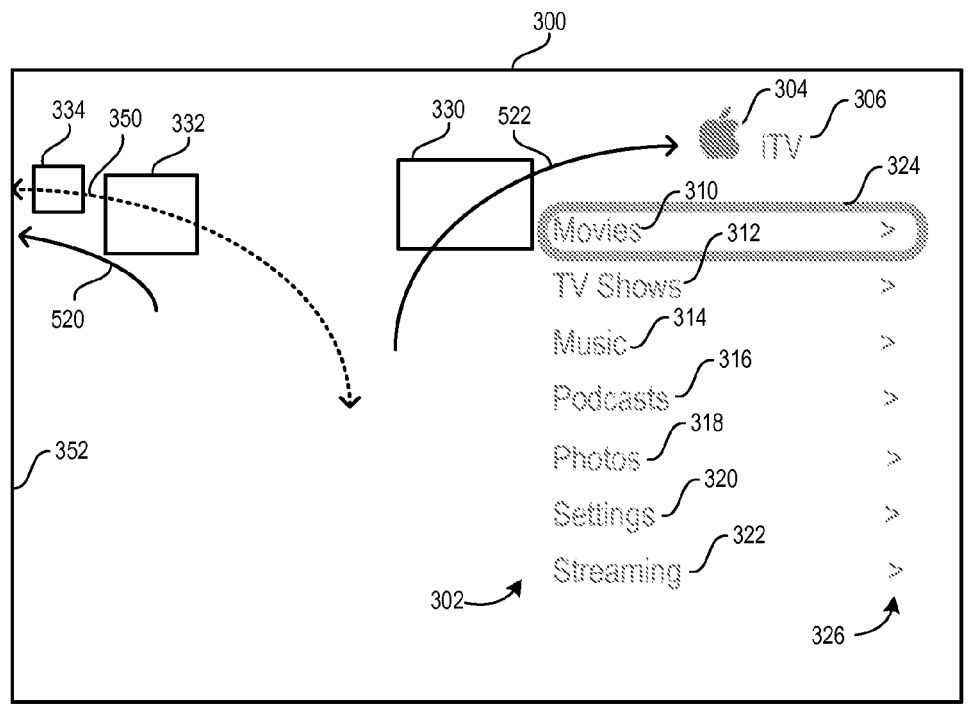

FIGS. 21 and 22 are block diagrams of an example transition from the media menu interface environment 300 to a content menu interface environment. The example transition shown in FIGS. 21 and 22 occurs upon the selection of a menu item highlighted by the highlight indicator 324, and can, for example, instantiate a corresponding media engine 116. Such a selection can be initiated by actuating the select area 168 on the rotational input device 110, for example.

In one implementation, selection of a media menu item when highlighted generates a content menu interface environment for processing media data related to such content, e.g., Movies, TV Shows, Music, etc. Upon selection of a highlighted media menu item, e.g., media menu item 310, the corresponding media menu item abstraction, e.g., media menu item abstraction 330, transitions to the title location occupied by the icon 304. Likewise, the title 306 is replaced by the context title of the media menu item, e.g., "Movies" for media menu item 310.

In one implementation, the size of the media menu item abstraction is scaled from a first display size in the foreground position to a smaller display size as the media menu item abstraction transitions from the foreground position to the title position, as indicated by the directional arrow 522 and example size indicators 606 and 608. The size can be proportioned, for example, according to a linear function of the distance of the media menu item abstraction from the title position, or proportioned according to a nonlinear function of the distance of the media menu item abstraction from the title position.

In one implementation, the media menu item abstractions in the background positions transition out of the display area through the terminus position. For example, as shown in FIGS. 21 and 22, the media menu item abstractions 332, 334 and 336 transition out of the media menu interface environment 300 by transitioning along the multidimensional path as indicated by the directional arrow 520, and off the edge 352 of the media menu interface environment 300.

In another implementation, the media menu 302 fades out of view during the transition from the media menu interface environment 300 to the content menu interface environment, as depicted in FIG. 22. The media menu 302 is replaced by a content menu after fading from view.

Figure 23:
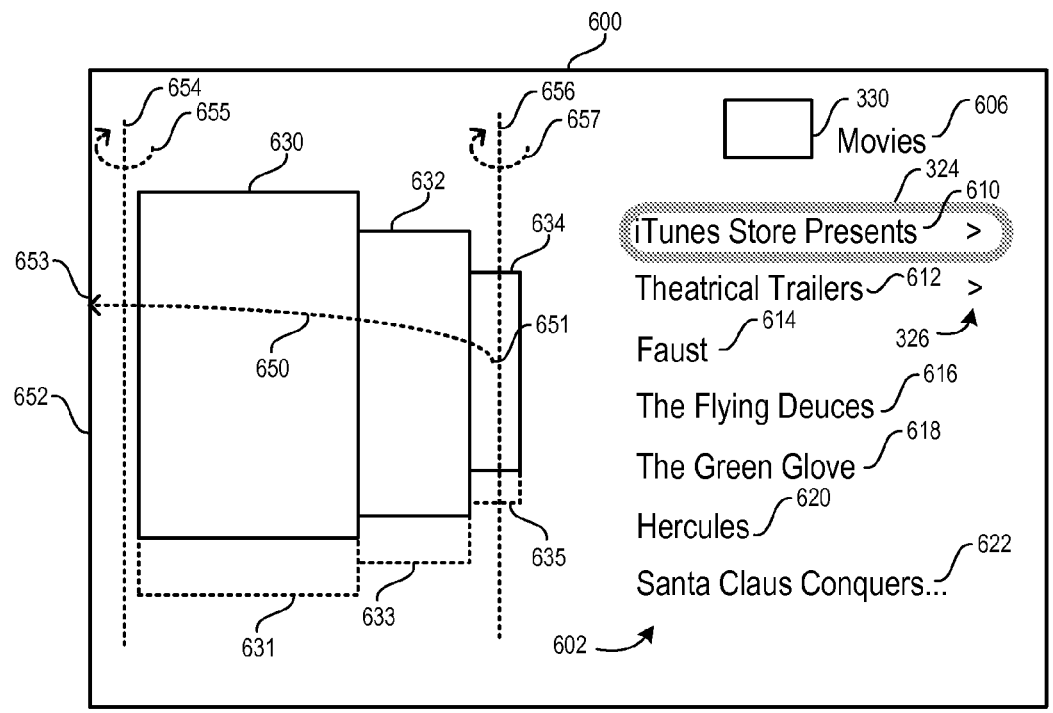
FIG. 23 is a block diagram of an example content menu interface environment.

FIG. 23 is a block diagram of an example content menu interface environment 600. The example content menu interface environment 600 of FIG. 23 corresponds to movie content, and can, for example, appear as the end result of the transition from the media menu interface environment 300 to a content menu interface environment as described with respect to FIGS. 21 and 22.

In one implementation, the content menu interface environment 600 includes a content menu 602 identified in part by a media menu item abstraction, such as the media menu item abstraction 330, in a title location and a title 606, e.g., "Movies," The content menu 602 includes content menu items 610, 612, 614, 616, 618, 620 and 622. The content menu 602 can also include the highlight indicator 324 that highlights a content menu item. A highlight selection of a menu item by the highlight indicator 324 indicates that the menu item is eligible for a further selection action, e.g., eligible to be selected by actuating the select area 168 on the rotational input device 110.

In one implementation, the first content menu item 610 is a sales content menu associated with content offered for sale. For example, the content menu item 610 is entitled "iTunes Store Presents, " and includes a child indicator 326. Selecting the iTunes Store Presents content menu item 610 can, for example, transition to another content menu that lists one or more content items available for purchase by download. In one implementation, the content items listed for sale correspond to the content type of the content menu 602. For example, the content menu interface environment 600 of FIG. 23 relates to Movies, and thus the content items listed in response to selecting the highlighted menu item 610 are movies.

In another implementation, another content menu item 612 is a preview content menu item. For example, the content menu item 612 is entitled "Theatrical Trailers" and includes a child indicator 326. Selecting the Theatrical Trailers content menu item 612 can, for example, transition to another content menu that lists one or more theatrical trailers that may be streamed to the media processing device 100. Other preview content menus may also be used, such as a "Previews" content menu, for example, that provides previews of movies that are currently available for purchase by download, or song clips for songs that are currently available for purchase by download, etc. In one implementation, the content items available for preview correspond to the content type of the content menu 602.

The content menu interface environment 600 also includes content abstractions that correspond to one or more content menu items. Fore example, the content abstractions 630, 632 and 634 correspond to the content menu item 610. In one implementation, the content abstractions are graphical representations of the content corresponding to the highlighted content menu item. For example, the content abstractions 630, 632 and 634, which correspond to the iTunes Presents content menu item 610, can comprise digital representations of movie posters for movies that are presently offered for sale at iTunes. Alternatively, digital representations of movie stills can be used, or video clips of the movies can be used, or some other content abstraction.

In one implementation, the content abstractions can include a reflection effect. For example, the content abstractions 630, 632 and 634 can include reflections 631, 633 and 635.

In one implementation, a set of content abstractions can be associated with a single content menu item, or can be associated with a plurality of content menu items. In the example content menu interface environment 600 of FIG. 23, for example, a first set of content abstractions is associated with the content menu item 610; a second set of content abstractions is associated with the second content menu item 612, and a third set of content abstractions is associated with the remaining content menu items 614, 616, 168, 620, and 622. Content abstractions can have the same aspect ratio, or can have different aspect ratios.

The first set of content abstractions, for example, can comprise digital representations of move posters for movies that are offered for sale through the sales content menu item 610. The second set of content abstractions, for example, can comprise movie clips for movies that are available for preview through the preview content menu item 612. Thus, changing the highlight indicator from the first content menu item 610 to the second content menu item 612 will likewise cause the content abstractions displayed to change from the first set of content abstractions to the second set of content abstractions. The remaining content menu items 614-622 correspond to content stored in a user library, and thus the third set of content abstractions, for example, can comprise digital representations of movie posters or movie stills of the corresponding movies listed in the library content menu items 614-622. Thus, changing the highlight indicator from the second content menu item 612 to the any of the library content menu items 614-622 will likewise cause the content abstractions displayed to change from the second set of content abstractions to the third set of content abstractions.

In one implementation, the content abstractions, e.g., content abstractions 630, 632, and 634, transition along a multidimensional path 650 having an ingress terminus 651 and an egress terminus 653 in a manner that provides the effect of transitioning in depth. For example, in FIG. 24, the content abstractions 630, 632, 634 and 636 depth transition along a three-dimensional coordinate system from the ingress terminus 651 to the egress terminus 653, e.g., along an axis substantially perpendicular to the screen, or according to an x-, y-, and z-translation in a three-dimensional environment, and the like. In one implementation, the ingress terminus 651 is within the content menu interface environment 600, e.g., beneath the content abstraction 634 of FIG. 23, and the egress terminus 653 is at an edge 652 of the content menu interface environment 600. The content abstractions emerge into the multidimensional path 650 at the ingress terminus 651 and are eliminated from the multidimensional path 650 at the egress terminus 653.

To further emphasize the multidimensional aspect, the content abstractions may rotate about an axis during the transition from the ingress terminus 651 to the egress terminus 653. For example, upon elimination at the egress terminus 653, the content abstractions may rotate about an axis 654 in the direction indicated by the rotational arrow 655. Likewise, upon entering at the ingress terminus 651, the content abstractions may begin a slight rotation about the axis 656 as indicated by the rotational arrow 657. In one implementation, the rotation begins at a relatively low angular rat and increases as the content abstraction nears the egress terminus 652. In one implementation, the rate of rotation increases nonlinearly to simulate an effect that the content abstraction is "flipped" out of the content menu interface environment 600.

In one implementation, the content abstractions are cycled sequentially through the multidimensional path 650, e.g., a set of twenty content abstractions cycle through the multidimensional path in a given order. In another implementation, the content abstractions are cycled randomly through the multidimensional path 650, e.g., a set of twenty content abstractions cycle through the multidimensional path in a random order.

Figure 24:
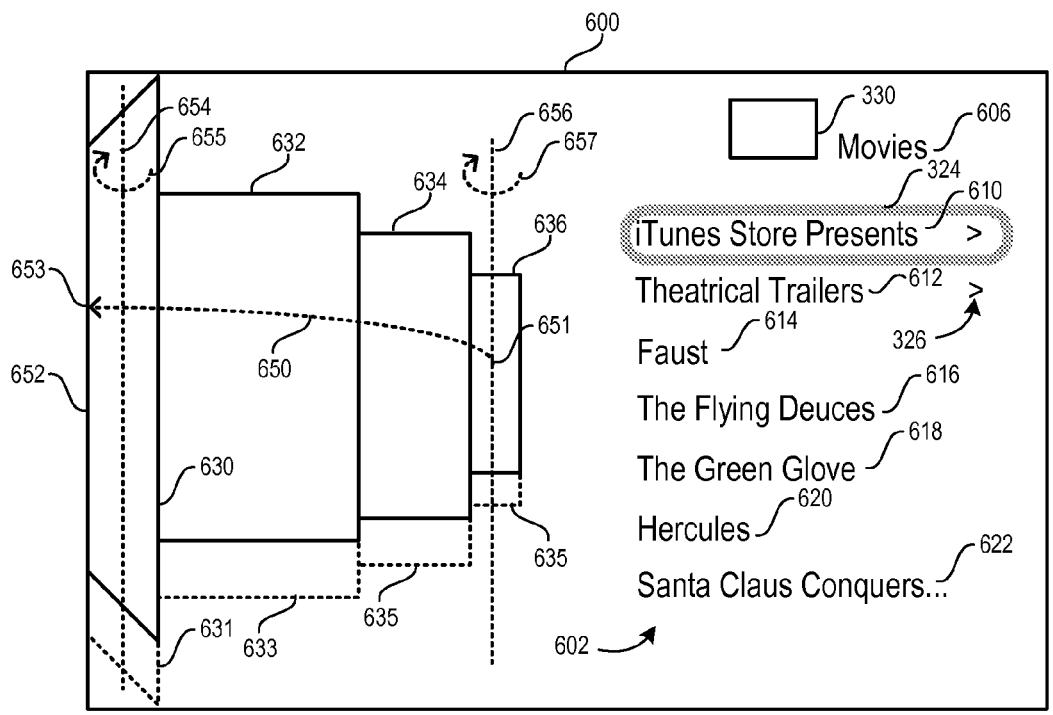
FIG. 24 is a block diagram of an example transition of a content abstraction through an egress terminus.

FIG. 24 is a block diagram of an example transition of the content abstraction 630 through the egress terminus 643. As shown in FIG. 24, the rate of the content abstraction 630 increases significantly as the content abstraction nears and begins exiting through the egress terminus 653. Additionally, content abstractions 632 and 634 transition in an overlapping manner along the multidimensional path 650, and another content abstraction 636 emerges at the ingress terminus 651.

In one implementation, content abstractions can repetitively emerge into the multidimensional path 650 at the ingress terminus 651, Thus, the content abstractions appear to cycle through the multidimensional path 650. The number of content abstractions that may cycle through the multidimensional path can, for example, depend on the amount of content associated with each content menu item or set of content menu items. Fore example, the content menu item 610 may provide access to a list of twenty titles available for purchase by download, and thus the first set of content abstractions associated with the content menu item 610 may comprise twenty digital representations of movie posters. Likewise, the content menu item 612 may provide access to a list of fifteen titles available for preview, and thus the second set of content abstractions associated with the content menu item 612 may comprise fifteen digital representations of movie posters. Similarly, if the library content menu items 614, 616, 618, 620 and 622 comprise the entire list of content titles in a user's library, then the content abstractions associated with the library content menu items 614, 616, 618, 620 and 622 may comprise five digital representations of movie posters.

In another implementation, content abstractions are scaled in size, for example, proportionally to the proximity of the content abstraction from the egress terminus. For example, in FIG. 24, the content abstraction 632 can be displayed at 100% of full scale; and the content abstraction 630 can be displayed at 140% of full scale.

The ingress terminus 651 and egress terminus 653 can be positioned elsewhere in the content menu interface environment 600. For example, the ingress terminus 651 and egress terminus 653 of FIGS. 23 and 24 can be interchanged to provide the effect of the content abstractions cycling in reverse order through the multidimensional path 650. Similarly, the ingress terminus 651 and/or egress terminus 653 may be positioned different locations, e.g., at a top edge or bottom edge of the content menu interface environment.

In another implementation, content abstractions associated with multiple content menu items may not constantly cycle; instead, a content abstraction can be transitioned to a foreground position when a corresponding content menu item is highlighted. For example, a highlighting of any one of the content menu items 614-622 may cycle a content abstraction corresponding to the highlighted content menu item to a foreground position, e.g., the position occupied by content abstraction 630 in FIG. 23. The cycling may then halt until another content menu item is selected.

In another implementation, changing a set of content abstractions is facilitated by introducing the new set of abstractions through the ingress terminus 651 and eliminating the previous set through the egress terminus 653. For example, changing the highlighted indicator 324 from the content menu item 610 to the content menu item 612 causes the content abstractions associated with the content menu item 612 to emerge from the ingress terminus 651, and precludes the content abstractions associated with the content menu item 610 from reemerging after elimination through the egress terminus 653.

Figure 25:
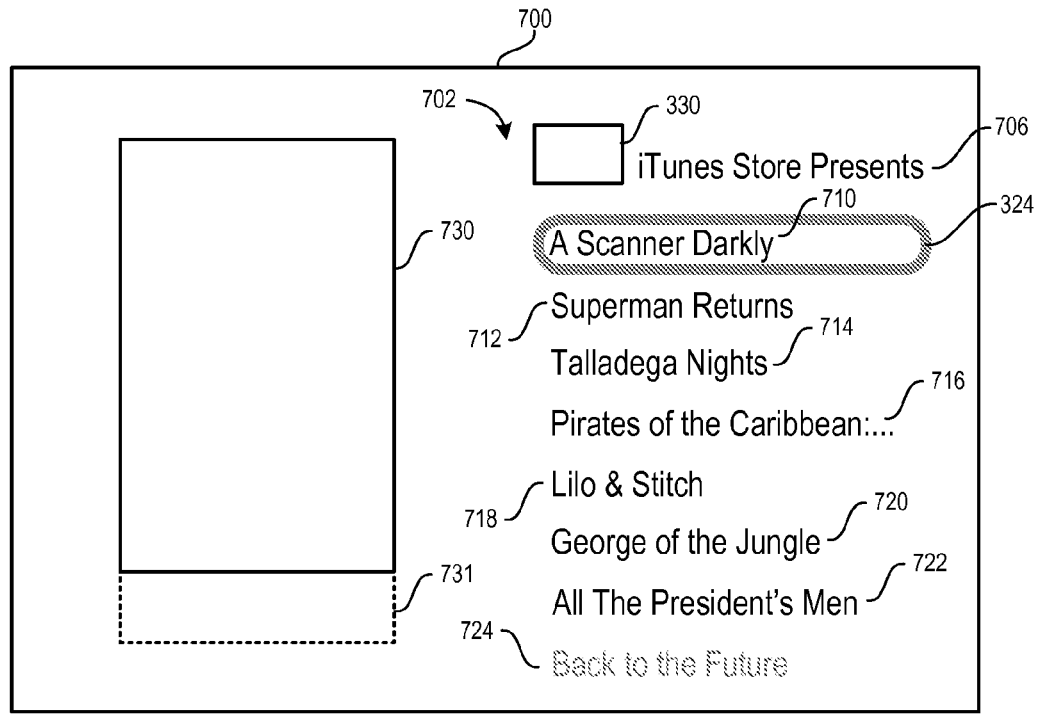
FIG. 25 is a block diagram of an example sales content menu interface environment.

FIG. 25 is a block diagram of an example sales content menu interface environment 700. The example sales content menu interface environment 700 can be generated in response to receiving s selection of highlighted sales content menu item, e.g., i Tunes Store Present content menu item 610. The example sales content menu interface environment 700 of FIG. 25 corresponds to movie content. Other sales content menu interface environment can also be generated for other content types, e.g., music, television shows, audio books, and the like.

In one implementation, the sales content menu interface environment 700 includes a sale content menu 702 identified in part by a media menu item abstraction, such as the media menu item abstraction 330, in a title location and a title 706, e.g., "iTunes Store Presents." The sales content menu 702 includes sales content menu items 710, 712, 714, 716, 718, 720, 722 and 724. The bottom sales content menu item 724 is partially faded, indicating that the list of sales content menu items continues beyond the sales content menu interface environment 700. Scrolling down to the sales content menu item 724 can, for example, causes additional sales content menu items to scroll into the sales content menu interface environment 750. The sales content menu 702 can also include the highlight indicator 324 that highlights a sales content menu item.

A sales content menu item abstraction 730 can be generated proximate to the sales content menu 702. In one implementation, the sales content menu item abstraction 730 includes a reflection 731. In the example implementation of FIG. 25, the sales content menu item abstraction 730 corresponds to the highlighted sales content menu item, e.g., sales content menu item 710. In another implementation, a plurality of sales content menu item abstractions can be displayed as transitioning through a multidimensional path such as the multidimensional path 650 of FIG. 23. In yet another implementation, a plurality of sales content menu item abstractions can be displayed in foreground and background positions along a multidimensional path such as the multidimensional path 350 of FIG. 4.

In one implementation, the sales content menu items 710-724 can be generated according to sales metrics of the provider, e.g., the most popular selling content titles. In another implementation, the sales content menu items 710-724 can be generated using a collaborative filter and based on a user's library titles and/r sales history. Other methods of identifying sales content can also be used.

Figure 26:
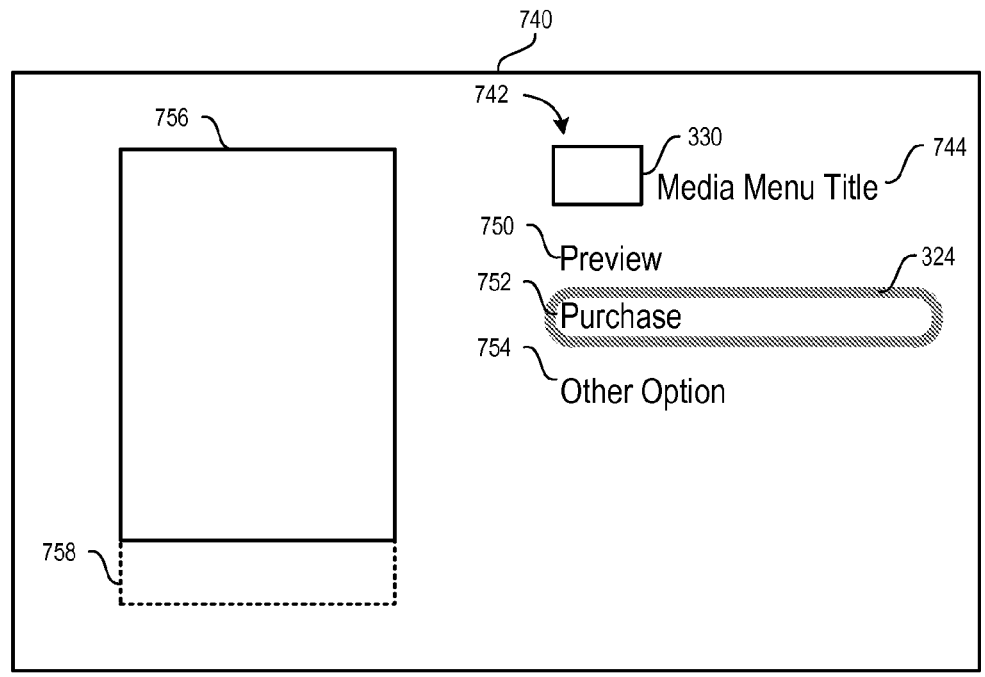
FIG. 26 is a block diagram of an example purchase content interface environment.

FIG. 26 is a block diagram of an example purchase content interface environment 740. The purchase content interface environment 740 can be generated in response to selecting a highlighted sale content menu item in the sales content menu item interface 700.

In one implementation, the example purchase content menu interface environment 740 includes a purchase content menu 742 identified in part by a media menu item abstraction, such as the media menu item abstraction 330, in a title location and a title 746. In one implementation, the title corresponds to the content title available for purchase. For example, selecting the content menu item 710 of FIG. 25 would result in an interface 740 having a title 746 of "A Scanner Darkly."

The purchase content menu 742 can include purchase content menu items 750, 752 and 754. Selection of the purchase content menu item 750, entitled "Preview," generates a preview of the content available for purchase. In one implementation, the preview can, for example, be streamed from the content provider.

Selecting the purchase content menu item 752, entitled "Purchase," debits a user's account for the purchase price of the content title and downloads the content title. In one implementation, the content title is downloaded to a user's computing device, such as computing device 208, for long term storage. The content title may later be copied to a data store on the media processing device 100 for viewing, or may be streamed from the computing device 208 to the media processing device 100 for viewing.

Selecting the purchase menu item 754, entitled "Other Option," invokes one or more functions related to other purchase options. For example, reviews of the content title can be provided, or a synopsis of the content title can be provided, or other options can be provided.

Figure 27:
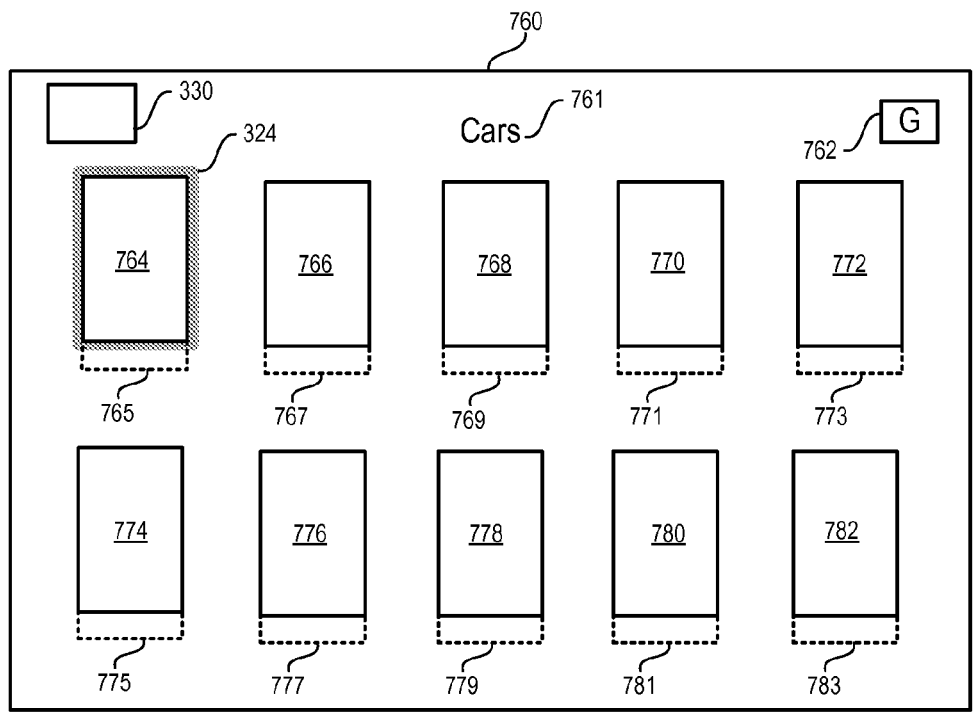
FIG. 27 is a block diagram of an example preview content menu interface environment.

FIG. 27 is a block diagram of an example preview content interface environment 760. The preview menu interface environment 760 can be generated in response to receiving a selection of highlighted preview content menu item, e.g., Theatrical Trailers content menu item 612. The example preview menu interface environment 760 can include a content menu item abstraction, e.g., content menu item abstraction 330, and a plurality of content abstractions 764, 766, 768, 770, 772, 774, 776, 778, 780 and 782. In one implementation, the content abstractions include respective reflections 765, 767, 769, 771, 773, 775, 777, 779, 781 and 783. A highlight indicator 324 highlights a content abstraction, e.g., content abstractions 764, eligible for selection. A content title 761, e.g., "Cars," and a rating symbol 762 corresponding to a rating of the highlighted content title, can also be displayed.

Selection of a highlighted content abstraction can generate a preview of the content title. In one implementation, the preview is streamed from the content provider. For example, selection of the content abstraction 764 can generate a preview for the movie entitled "Cars," In this implementation, the preview comprises a theatrical trailer. In other implementations, other previews can be shown, e.g., a short documentary, such as "The Making of Cars," can be shown.

The type of content abstraction displayed can depend on the type of content to be previewed. For example, if the content is movies, then the content abstractions can be digital representations of movie posters or movie stills. Likewise, if the content is audio books, then the content abstractions can be digital representations of book jackets. Other content abstractions can also be displayed.

Figure 28:
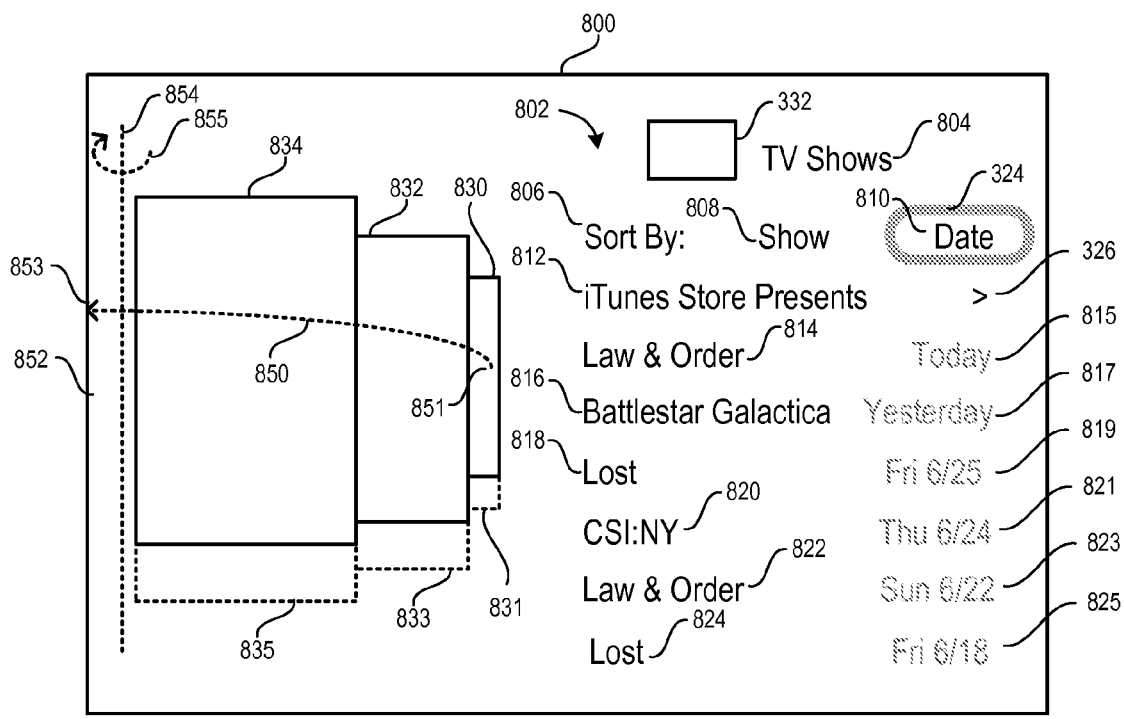
FIGS. 28 and 29 are block diagram of another example content menu interface environment.
Figure 29:
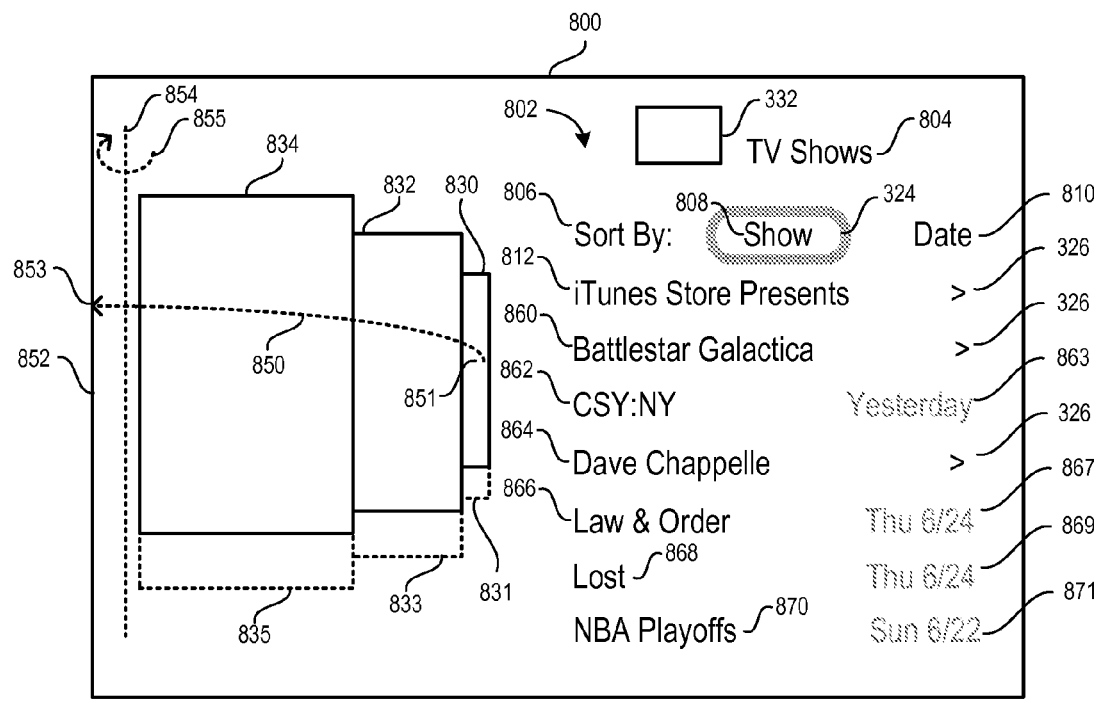

FIGS. 28 and 29 are block diagrams of another example content menu interface environment 800. The example content menu interface environment 800 corresponds to television content, and can, for example, appear as the end result of the transition from the media menu interface environment 300 to a content menu interface environment after selecting the media menu item 312 entitled "TV Shows." A corresponding media engine 116 can, for example, be instantiated upon such transition.

In one implementation, the content menu interface environment 800 includes a content menu 802 identified in pray be a media menu item abstraction, such as the media menu item abstraction 332, in a title location and a title 804, e.g., "TV Shows." The content menu 802 includes content menu items 812, 184, 816, 818, 820, 822 and 824. The content menu 802 can also include the highlight indicator 324 that highlights a content menu item. The content menu items, can, for example, correspond to television shows that have either been recorded from a broadcast or purchased from a content provider.

In one implementation, the content menu 802 also includes a sort field 806 that includes a first sort option 808 and a second sort option 810. Selection of the first sort option 808 can, for example, sort the content menu items by a program category, e.g., a program title. In one implementation, multiple instances of the same program title are grouped into folders, as indicated by the child indicators 326 of FIG. 29. A single instance of a program title can, for example, be displayed according to a date, as indicated by the date fields 863, 867, 869 and 871 of FOG. 29. In one implementation, the date corresponds to an acquisition date, e.g., the date the content title was purchased from a content provider or recorded from a broadcast. In another implementation, the date corresponds to an episode order for episode content.

Selection of the second sort option 810 sorts the content menu items according to a date, as indicated by the date fields 815, 817, 819, 821, 823, and 825 of FIG. 28. In one implementation, the sort date corresponds to an acquisition date, e.g., the date the content title was purchased from a content provider or recorded from a broadcast. In another implementation, the sort date corresponds to an episode order for episodic content.

In one implementation, the first content menu item 812 is a sales content menu associated with content offered for sale. For example, the content menu item 812 is entitled "iTunes Store Presents," and includes a child indicator 326. Selecting the iTunes Store Presents content menu item 812 can, for example, transition to another content menu that lists one or more content items available for purchase by download. In one implementation, the content items listed for sale correspond to the content type of the content menu 802. For example, the content menu interface environment 800 of FIG. 28 related to Television Shows, and thus the content items listed in response to selecting the highlighted menu item 812 are television programs.

The content menu interface environment 800 also includes content abstractions that correspond to one or more content menu items. For example, the content abstractions 830, 832 and 834 correspond to the content menu items 814-824 in FIG. 28 or 860-870 in FIG. 29. In one implementation, the content abstractions are graphical representations of the content corresponding to the highlighted content menu item. Fore example, the content abstractions 820, 832 and 834, which correspond to the sorted content menu items, can comprise digital representations of television program art or television program stills for television programs that are stored in a library.

In one implementation, the content abstractions can include a reflection effect. For example, the content abstractions 830, 832 and 834 can include reflections 831, 833, and 835.

In one implementation, a set of content abstractions can be associated with a single content menu item, or can be associated with a plurality of content menu items. In the example content menu interface environment 800 of FIG. 28, for example, a first set of content abstractions is associated with the content menu item 812, and a second set of content abstractions is associated with remaining content menu items 814-824. The first set of content abstractions can, for example, comprise digital representations of television program art for television programs that are offered for sale through the sales content menu item 812, and second set of content abstractions can correspond to the content titles stored in a user library.

In one implementation, the content abstractions, e.g., content abstractions 830, 832, and 834, transition along a multidimensional path 850 having an ingress terminus 851 and egress terminus 853. In one implementation, the ingress terminus 851 is within the content menu interface environment 800, e.g., beneath the content abstraction 834 of FIG. 28, and the egress terminus 853 is at an edge 852 of the content menu interface environment 800. The content abstractions emerge into the multidimensional path 850 at the ingress terminus 851 and are eliminated from the multidimensional path 851 at the egress terminus 853. The content abstractions can transition through the multidimensional path 850 and rotate about an axis 854 as indicated by the rotational arrow 855 in the same manner as described with respect to the content abstractions of FIGS. 23 and 24.

Figure 30:
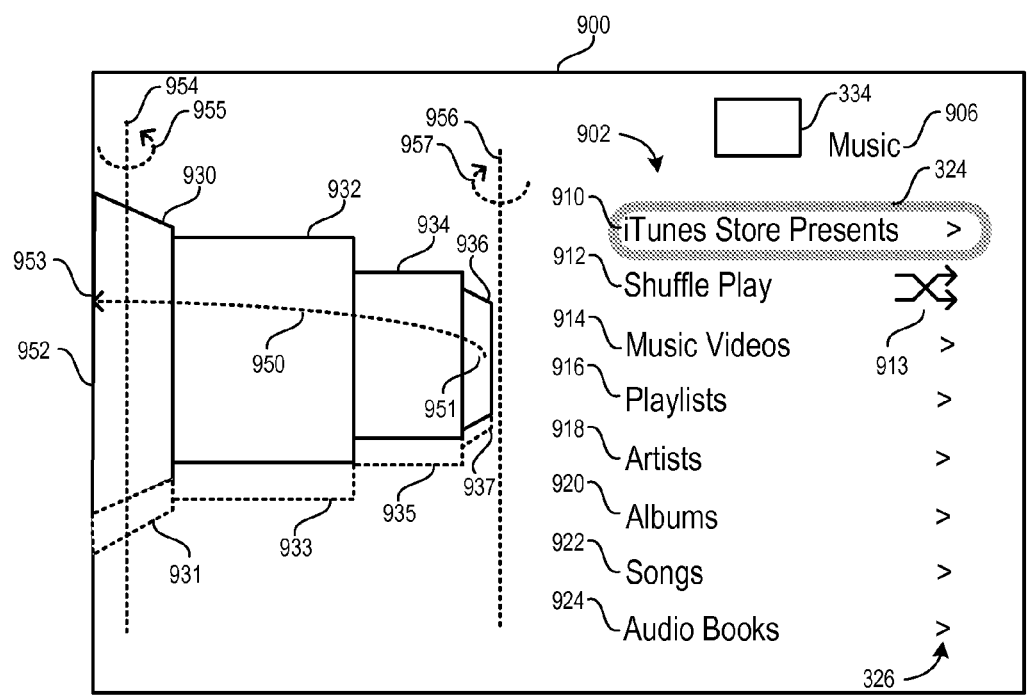
FIG. 30 is a block diagram of another example content menu interface environment.

FIG. 30 is a block diagram of another example content menu interface environment 900. The example content menu interface environment 900 corresponds to music content, and can, for example, appear as the end result of the transition from the media menu interface environment 300 to a content menu interface environment after selecting the media menu item 314 entitled "Music." A corresponding media engine 116 can, for example, be instantiated upon such transition.

In one implementation, the content menu interface environment 900 includes a content menu 902 identified in part by a media menu item abstraction, such as the media menu item abstraction 334, in a title location and a title 906, e.g., "Music." The content menu 902 can include, for example, content menu items 910, 912, 914, 916, 918, 922, and 924. The content menu 902 can also include the highlight indicator 324 that highlights a content menu item.

In one implementation, the first content menu item 910 is a sales content menu associated with content offered for sale. For example, the content menu item 910 is entitled "iTunes Store Present," and includes a child indicator 326. Selecting the iTunes Store Presents content menu item 910 can, for example, transition to another content menu that lists one or more content items available for purchase by download. In one implementation, the content items listed for sale correspond to the content type of the content menu 902. For example, the content menu interface environment 900 of FIG. 30 relates to music, and thus the content items listed in response to selecting the highlighted menu item 910 are musical titles and audio titles, e.g., songs, collections, audio books, and the like.

In one implementation, selection of the content menu item 912, entitled "Shuffle Play," initiates a shuffle play of content titles, as indicated by the shuffle indicator 913. Selection of the content menu item 914, entitled "Music Videos," lists music videos according to one or more music video hierarchal categories. Selection of the content menu item 916, entitled "Playlists," lists playlists according to one or more playlist hierarchal categories. Selection of the content menu item 918, entitled "Artists," lists audio content according to one ore more artists hierarchal categories. Selection of the content menu item 920, entitled "Albums." lists audio content according to one or more hierarchal album categories. Selection of the content menu item 922, entitled "Songs," lists audio content according to one or more songs hierarchal categories. Selection of the content menu item 924, entitled "Audio Books, " lists audio books according to one or more audio book hierarchal categories. Other content menu items can also be used.

The content menu interface environment 900 also includes content abstractions that correspond to one or more content menu items. For example, the content abstractions 920, 932 and 934 correspond to the content menu item 910. In one implementation, the content abstractions are graphical representations of the content corresponding to the highlighted content menu item. For example, the content abstractions 920, 932, 934 and 936, which correspond to the iTunes Presents content menu item 910, can comprise digital representation of album art for songs that are presently offered for sale at iTunes.

In one implementation, the content abstractions can include a reflection effect. For example, the content abstractions 920, 932, 934 and 936 can include reflections 931, 933, 937, and 937.

In one implementation, a set of content abstractions can be associated with a single content menu item, or can be associated with a plurality of content menu items. In the example abstractions is associated with the content menu item 910; a second set of content abstractions is associated with the second content menu item 912; a third set of content abstractions is associated with content menu item 914; a fourth set is associated with the content menu items 916, 918, 920 and 922, and a fifth set is associated with the content menu item 924.

The first set of content abstractions can, for example, comprise digital representations of album art for songs that are offered for sale through the sales content menu item 910. The second set of content abstractions can, for example, comprise digital representations of content titles that are eligible for selection through a shuffle play. The third set of content abstractions can, for example, comprise digital representations of music videos, e.g., video stills or video clips, that are categorized under the content menu item 914. The fourth set of content abstractions can, for example, comprise digital representations of content titles categorized under the content menu items 916, 918, 920 and 922. The fifth set of content abstractions can, for example, comprise digital representations of book jacket art for audio books that are categorized under the content menu item 924.

In one implementation, the content abstractions, e.g., content abstractions 930, 932, and 934, transition along a multidimensional path 950 having an ingress terminus 951 and an egress terminus 953. In one implementation, the ingress terminus 951 is within the content menu interface environment 900, e.g., beneath the content abstraction 934 of FIG. 30, and the egress terminus 953 is at an edge 952 of the content menu interface environment 900. The content abstractions emerge into the multidimensional path 950 at the ingress terminus 951 and are eliminated from the multidimensional path 951 at the egress terminus 953. The content abstractions can transition through the multidimensional path 950 and rotate about an axis 954 as indicated by the rotational arrow 955 upon egress in a similar manner as described with respect to the content abstractions of FIGS. 23 and 24, except that the rotation in FIG. 30 is reversed, i.e., counterclockwise.

Additionally, the content abstractions can initially rotate in a clockwise direction, as indicated by the rotational arrow 957, about an axis 956. In one implementation, the content abstractions enter the ingress terminus 951 at approximately a normal disposition, e.g., approximately 90 degrees, and rotate in the clockwise direction during the transition through the multidimensional path 950.

Figure 31:
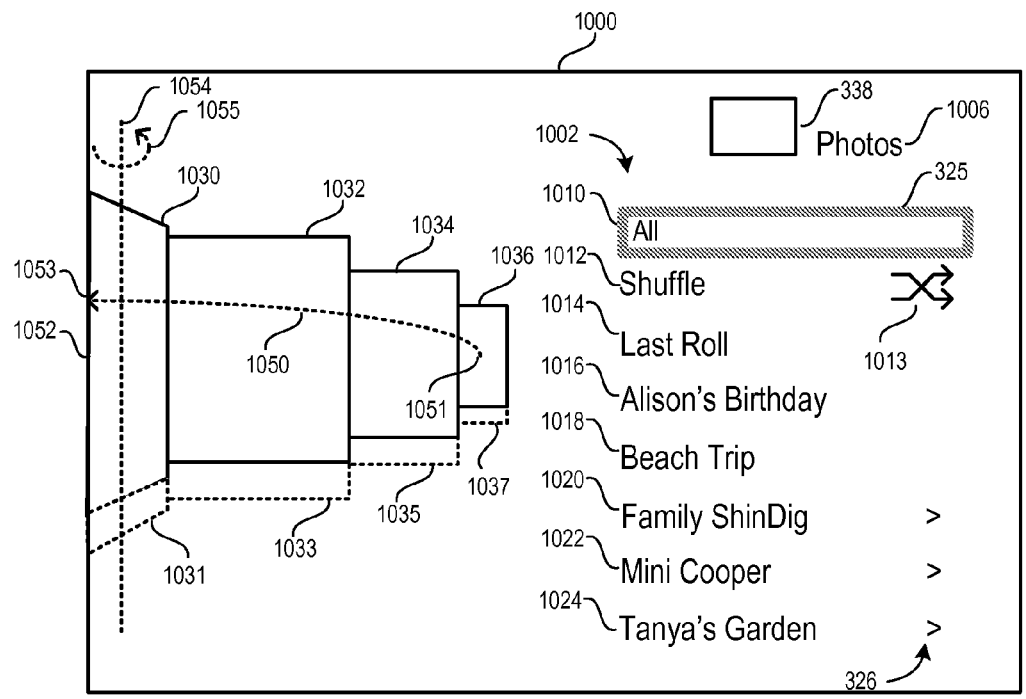
FIG. 31 is a block diagram of another example content menu interface environment.

FIG. 31 is a block diagram of another example content menu interface environment 1000. The example content menu interface environment 1000 corresponds to photographic content, and can, for example, appear as the end result of the transition from the media menu interface environment 300 to a content menu interface environment after selecting the media menu item 318 entitled "Photos." A corresponding media engine 116 can, for example, be instantiated upon such transition.

In one implementation, the content menu interface environment 1000 includes a content menu 1002 identified in part by a media menu item abstraction, such as the media menu item abstraction 338, in a title location and a title 1006, e.g., "Photos." The content menu 1002 can include, for example, content menu items 1010, 1012, 1014, 1016, 1018, 1022, and 1024. The content menu 1002 can also include a highlight indicator 325 that highlights a content menu item. In this implementation, the highlight indicator 325 is rectangular, and includes a backlit-style glow highlight.

In one implementation, the first content menu item 1010 is an "All" content menu associated with all photographic content stored in a user library. Selection of the content menu item 1010 can, for example, list all photographs stored in a user library. Selection of the content menu item 1012, entitled "Shuffle," initiates a shuffle presentation of photos, as indicated by the shuffle indicator 1013. Selection of the content menu item 1014, entitled "Last Roll," lists photographs collected during a most recent photographic session. Selection of the content menu items 1016-1024 lists photographs categorized under each respective content menu item. Content menu items that include a child indicator 326, e.g., content menu items 1020, 1022, and 1024, can include one or more subfolder categories. Other content menu items can also be used.

The content menu interface environment 1000 also includes content abstractions that correspond to one or more content menu items. For example, the content abstractions 1030, 1032, 1034 and 1036 correspond to the content menu item 1010. In one implementation, the content abstractions are the photographs associated with each content menu item. In one implementation, a set of content abstractions can be associated with a single content menu item, or can be associated with a plurality of content menu items. In the example content menu interface environment 1000 of FIG. 31, for example, each content menu item has a corresponding set of content menu item abstractions.

In one implementation, the content abstractions can include a reflection effect, Fore example, the content abstractions 1030, 1032, 1034 and 1036 can include reflections 1031, 1033, 1035 and 1037.

In one implementation, the content abstractions, e.g., content abstractions 1030, 1032, 1034 and 1036, transition along a multidimensional path 1050 having an ingress terminus 1051 and an egress terminus 1053. In one implementation, the ingress terminus 1051 is with the content menu interface environment 1000, e.g., beneath the content abstractions 1034 of FOG. 31, and the egress terminus 1053 is at an edge 1052 of the content menu interface environment 1000. The content abstractions emerge into the multidimensional path 1050 at the egress terminus 1053. The content abstractions can transition through the multidimensional path 1050 and rotate about an axis 1054 as indicated by the rotational arrow 1055 in a similar manner as described with respect to the content abstractions of FIGS. 23 and 24.

Figure 32:
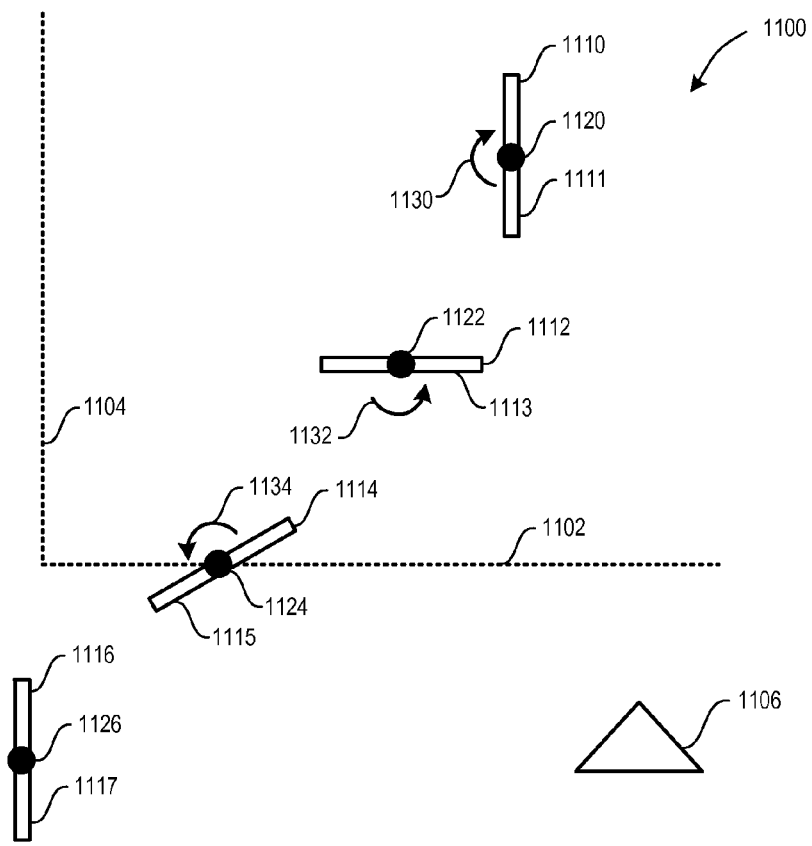
FIG. 32 is a block diagram of an example rendering of content abstractions in a multidimensional environment.

FIG. 32 is a block diagram of an example rendering of content abstraction in a multidimensional environment 1100. The perspective of FIG. 32 is a top view of the multidimensional environment 1100, e.g., a top view of a three-dimensional space. An x-axis 1102 defines a from plane and a z-axis 1104 defines side plane in the multidimensional environment 1100. The plane of the x-axis 1102 can, for example, be a viewing surface of a user interface as viewed from a camera 1106 perspective.

A plurality of content abstractions 1110, 1112, 1114 and 1116 transition along a multidimensional path defined by positions 1120, 1122, 1124 and 1126. Each of the content abstractions 1110, 1112, 1114 and 1116 has a corresponding front surface depiction 1111, 1113, 1115 and 1117 on which content may be displayed, e.g., movie poster art, album art, photos, video clips, text, or other content types.

The example rendering of the multidimensional environment 1110 shows a top view of a frame during which each of the content abstractions 1110, 1112, 1114 and 1116 are coincident with respective positions 1120, 1122, 1124 and 1126, respectively. The x-and z-coordinates and the angle of the front surface of each content abstraction relative to the x-axis are provided in Table 1 below;

TABLE 1

| Position: | 1120 | 1122 | 1124 | 1126 |
|---|---|---|---|---|
| Angle: | 90° | 0° | 30° | 90° |
| z-coordinate: | −2000 | −1000 | 0 | 1000 |
| x-coordinate: | 207 | 138 | 69 | 0 |

In the example implementation of FIG. 32, the content abstractions can progress from position 1120 to 1126. In another implementation, the content abstractions can progress from position 1126 to position 1120.

Also in the example implementation of FIG. 32, the content abstractions progress at a constant rate along the x-axis and z-axis, e.g., 1000 units along the z-axis and 69 units along the z-axis between each position 1120, 1122, 1124 and 1126 and over a given number of frames. In other implementations, the rate along one or both axes may vary either substantially linearly or substantially non-linearly.

Also in the example implementation of FIG. 32, the y-coordinates of the position are selected to generate the appearance that the content abstractions are moving along a common plane. In other implementations, the y-coordinate may by varied to generate the effect that the content abstractions are descending, ascending, or floating on separate planes. Other effects can also be generated.

As the content abstractions 1110, 1112, 1114 and 1116 transition to adjacent positions, the respective angle of each abstraction is rotated as indicated by rotational direction arrows 1130, 1132 and 1134. Thus, during the transition from a first position, e.g., position 1120, to a second position, e.g., position 1122, a content abstraction, e.g., content abstraction 1110, rotates in a direction, e.g., clockwise, from 90 degrees to 0 degrees. Similarly, during the transition from position 1122 to position 1124, the content abstraction rotates from 0 degrees to 30 degrees in a direction, e.g., counterclockwise, and during the transition from position 1124 to position 1126, the content abstraction rotates from 30 degrees to 90 degrees in a direction, e.g., counterclockwise. Other rotational ranges and rotational directions can also be selected. Additionally, the number of positions can be increased, e.g., to five, six, etc., or decrease, e.g., to three or even two.

In one implementation, the rate of rotation between positions is substantially linear. For example, if a content abstraction moves one unit in the x-direction and approximately 14.5 units in the z-direction during each video frame, and each location is separated by 69 units along the x-axis and 1000 units along the z-axis, then approximately 69 video frames are generated during a transition of a content abstraction from any position to an adjacent position. Accordingly, during the transition from position 1120 to 1122, a content abstraction will rotate approximately 90/69 degrees for each video frame, or about 1.3 degrees for each video frame. Likewise, during the transition form position 1122 to 1124, a content abstraction will rotate approximately 30/69 degrees, or about 0.43 degrees for each video frame; and during the transition form position 1124 to 1126, a content abstraction will rotate approximately 30/69 degrees, or about 0.87 degrees for each video frame.

In another implementation, the rotational rate between positions can be substantially non-linear. For example, the rotational rate during a transition from a first position to a second position may exponentially decrease (or increase), thus providing the appearance of an initially rapid but over-damped rotation beginning at each position (e.g., positions 1120, 1122, 1124 and 1126). Other rotational rate processes can also be used.

In other implementation, the content abstraction can obtain a final angle associated with an adjacent position before transitioning to the adjacent position. For example, during a transition from a first position to a second position, a content abstraction can obtain the angle associated with the second position mid-way through the transition and cease rotating. The content abstraction can again rotate upon reaching the second position, at which time a transition to a third position associated with another angle begins.

In another implementation, a content abstraction may also "fade-in" upon emergence into the multidimensional path defined by the positions 1120, 1122, 1124 and 1126. For example, the content abstraction 1110 may fade into view during the transition from the position 1120 to position 1122.

In one implementation, the multidimensional environment 1100 is rendered utilizing a rendering thread and a queuing thread. The rendering thread updates the position of the content abstractions in the multidimensional environment 1100, and frees memory and processing queuing thread loads image data from media assets, e.g., image files of movie posters, for example. When the rendering thread pulls a content abstraction from the queue, the queuing thread loads another image to generate another content abstraction. In one implementation, the queuing thread maintains at least two content abstractions in a queue for the rendering thread. Other processing methods and allocations of resources can also be used.

Figure 33:
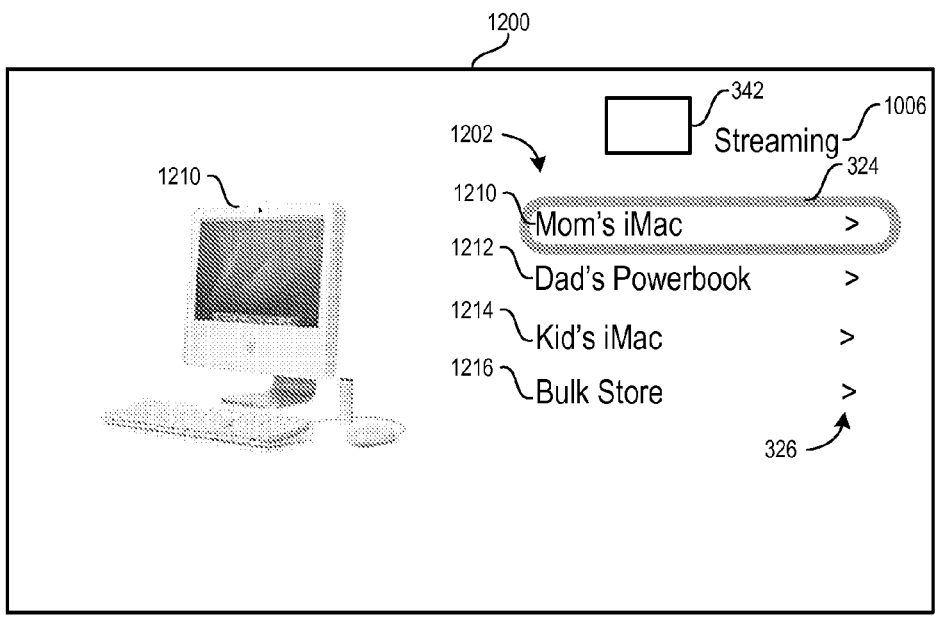
FIG. 33 is a block diagram of another example content menu interface environment.

FIG. 33 is a block diagram of another example content menu interface environment 1200. The example content menu interface environment 1200 corresponds to streaming content, and can, for example, appear as the end result of the transition from the media menu interface environment 300 to a content menu interface environment after selecting the media menu item 322 entitled "Streaming." A corresponding media engine 116 can, for example, by instantiated upon such transition.

In one implementation, the content menu interface environment 1200 includes a content menu 1202 identified in part by a media menu item abstraction, such as the media menu item abstraction 342, in a title location and a title 1206, e.g., "Streaming." The content menu 1202 can include, for example, content menu items 1210, 1212, 1214, and 1216. The content menu 1202 can also include the highlight indicator 324 that highlights a content menu item.

Each of the content menu items 1210, 1212, 1214 and 1216 can, for example, correspond to a data store accessible over a local area network, e.g., one or more computers accessible over a wireless or wired network. Each of the corresponding data stores can store content that can, for example, be pushed to or pulled to the media processing system 100. For example, the data store corresponding, to the content menu item 1201 may store photographic files; the data store corresponding to the content menu item 1212 may store movie and video files; the data store corresponding to content menu item 1214 may store music files; and the data store corresponding to content menu item 1216 may store all of the data files stored in the data stores corresponding to content menu items 1210, 1212, and 1214. The files may be downloaded to the media processing system 100 or streamed to the media processing 100 for processing.

Figure 34:
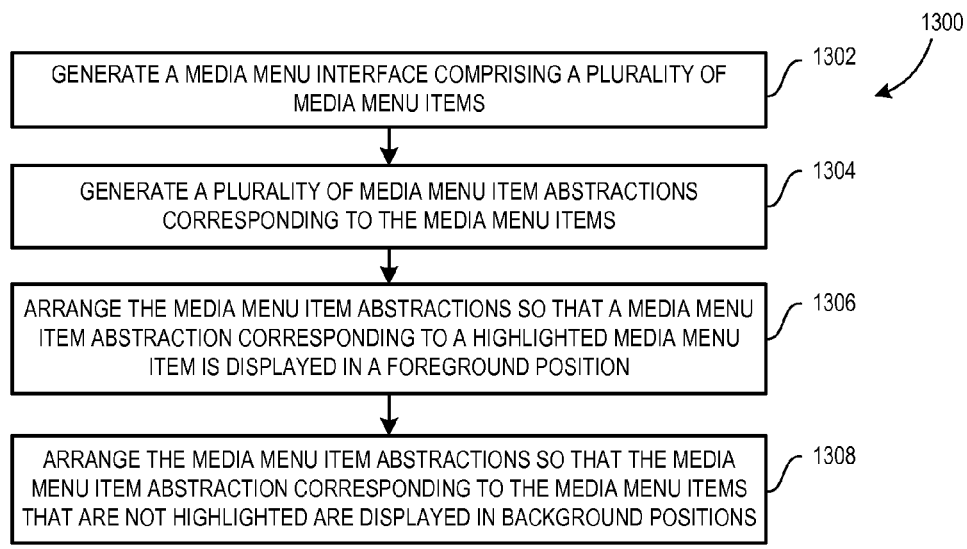
FIG. 34 is a flow diagram of an example process for generating a media menu interface environment.

FIG. 34 is a flow diagram of an example process 1300 for generating a media menu interface environment. In one example implementation, the processing device 104 and/or UI engine 114 can perform operations to implement the process 1300.

State 1302 generates a media menu interface comprising a plurality of media menu items. For example, the processing device 104 and/or UI engine 114 can display one or more media menu items 310-322 in the media menu interface environment 330.

Stage 1304 generates a plurality of media menu item abstractions corresponding to the media menu items. For example, the processing device 104 and/or UI engine 114 can generate one or more media menu item abstractions 330-342.

Stage 1306 arranges the media menu item abstractions so that a media menu item abstraction corresponding to a highlighted media menu item is displayed in a foreground position. For example, the processing device 104 and/or UI engine 114 can display a media menu item abstraction in a foreground position, such as media menu item abstraction 330 in FIG. 4.

Stage 1308 arranges the media menu item abstractions so that the media menu item abstractions corresponding to media menu items that are not highlighted are displayed in background positions. For example, the processing device 104 and/or UI engine 114 can display media menu item abstractions in the background positions, such as the media menu item abstractions 332-226 in FIG. 4.

Figure 35:
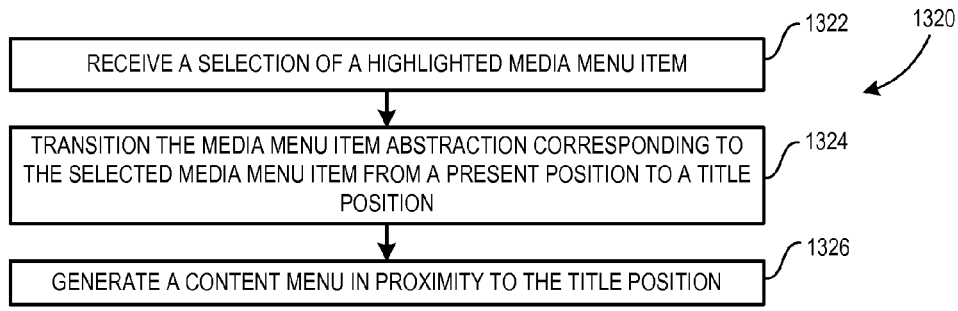
FIG. 35 is a flow diagram of an example process for transitioning from a media menu interface environment to a content menu interface environment.

FIG. 35 is a flow diagram of an example process for transitioning from a media menu interface environment to a content menu interface environment. In one example implementation, the processing device 104 and/or UI engine 114 and corresponding media engine 116 can perform operations to implement the process 1320.

Stage 1322 receives a selection of a highlighted media menu item, and stage 1324 transitions the media menu item abstraction corresponding to the highlighted media menu item from a present position to a title position. For example, the processing device 104 and/or UI engine 114 can process a selection and perform the transition such as the transition depicted in FIGS. 21 and 22.

Stage 1326 generates a content menu in proximity to the proximity to the title position. For example, the processing device 104 and/or UI engine 114 and corresponding media menu engine 116 can generate at corresponding content menu in proximity to the title position, such as the content menu 602 shown in FIG. 23.

Figure 36:
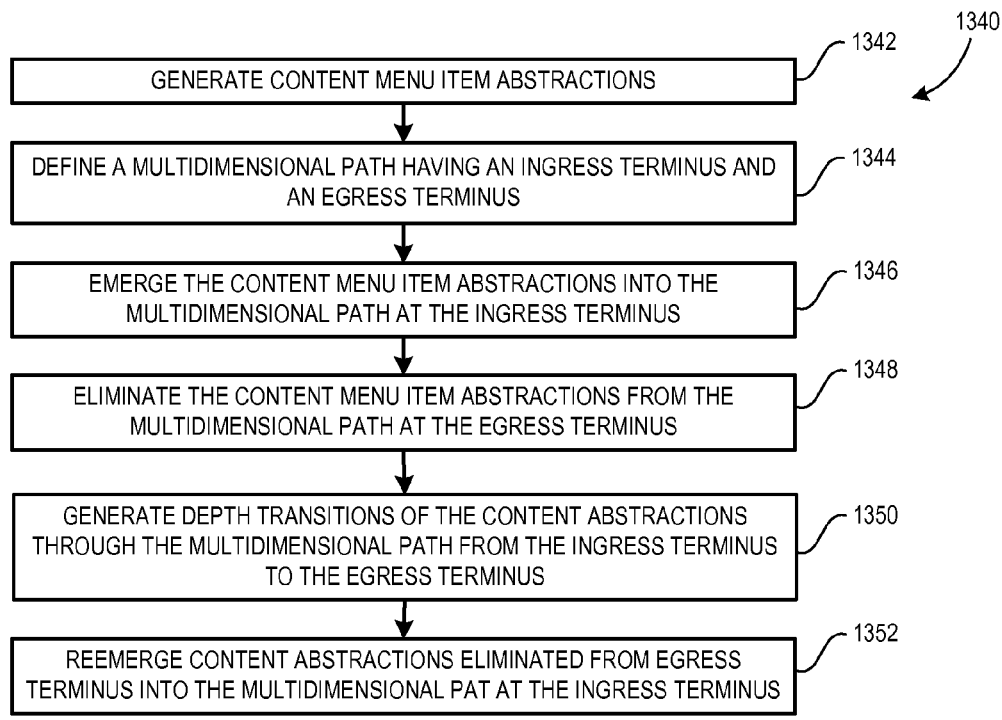
FIG. 36 is a flow digram of an example process for sorting library menu items.

FIG. 36 is a flow diagram of an example process 1340 for displaying content aberrations. In one example implementation, the processing device 104 and/or UI engine 114 and corresponding media engine 116 can perform operations to implement the process 1340.

Stage 1342 generates content abstractions. In one implementation, the content abstractions can correspond to content items or content menu items. Fore example, the processing device 104 and/or UI engine 114 and corresponding media engine 116 can generate the content abstractions, such as the content abstractions 630-634 shown in FIG. 23.

Stage 1344 defines a multidimensional path having an ingress terminus and an egress terminus. For example, the processing device 104 and/or UI engine 114 and corresponding media engine 116 can define a multidimensional path having an ingress terminus and an egress terminus, such as the multidimensional path 650 shown in FIG. 23.

Stage 1346 emerges the content abstractions into the multidimensional path at the ingress terminus. For example, the processing device 104 and/or UI engine 114 and corresponding media engine 116 can emerge the content abstractions into the multidimensional path at the ingress terminus, such as the ingress terminus 651 shown in FIG. 23.

Stage 1348 eliminates the content abstractions from the multidimensional path at the egress terminus. For example, the processing device 104 and/or UI engine 114 and corresponding media engine 116 can eliminate the content abstractions from the multidimensional path at the egress terminus, such as the egress terminus 653 shown in FIG. 23. Stage 1350 generates depth transitions of the content abstractions through the multidimensional path from the ingress terminus to the egress terminus. For example, the processing device 104 and/or UI engine 114 and corresponding media engine 116 can generate depth transitions of the content abstractions through the multidimensional path from the ingress terminus to the egress terminus, such as the depth transitions shown in FIG. 24.

Stage 1352 reemerges the content abstractions eliminated at the egress terminus into the multidimensional path at the ingress terminus. For example, the processing device 104 and/or UI engine 114 and corresponding media engine 116 can reemerge the content abstractions eliminated at the egress terminus into the multidimensional path at the ingress terminus, such as the ingress terminus 651.

Figure 37:
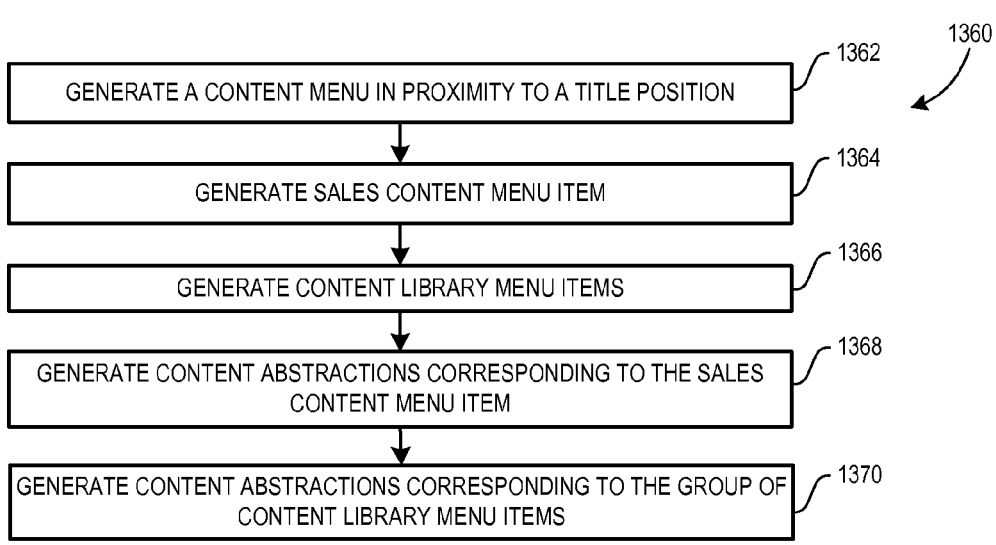
FIG. 37 is a flow diagram of an example process for generating content abstractions corresponding to content menu items.

FIG. 37 is a flow diagram of an example process 1360 for generating content abstractions corresponding to content menu items. In one example implementation, the processing device 104 and/or UI engine 114 and corresponding media engine 116 can perform operations to implement the process 1360.

Stage 1362 generates a content menu in proximity to a title position. For example, the processing device 104 and/or UI engine 114 and corresponding media engine 116 can generate a content menu in proximity to title position, such as the content menu 602 shown in FIG. 23.

Stage 1364 generates a sales content menu item. For example, the processing device 104 and/or UI engine 114 and corresponding media engine 116 can generate a sales content menu item, such as the "iTunes Store Presents" content menu item 610 shown in FIG. 23.

Stage 1366 generates library content menu items. For example, the processing device 104 and/or UI engine 114 and corresponding media engine 116 can generate the content library menu items, such as the content menu items 614-622 shown in FIG. 23.

Stage 1368 generates content abstractions corresponding to the sales content menu item. For example, the processing device 104 and/or UI engine 114 and corresponding media engine 116 can generate content abstractions for the corresponding sale content menu item by receiving content information from a content provider, such as the content abstractions 630, 632 and 634 shown in FIG. 23.

Stage 1370 generates content abstractions corresponding to a group of library content menu items. For example, the processing device 104 and/or UI engine 114 and corresponding media engine 116 can generate content abstractions corresponding to a group of library content menu items from content data stored in one or more user libraries, such as content abstractions corresponding to library content menu items 614-622.

Figure 38:
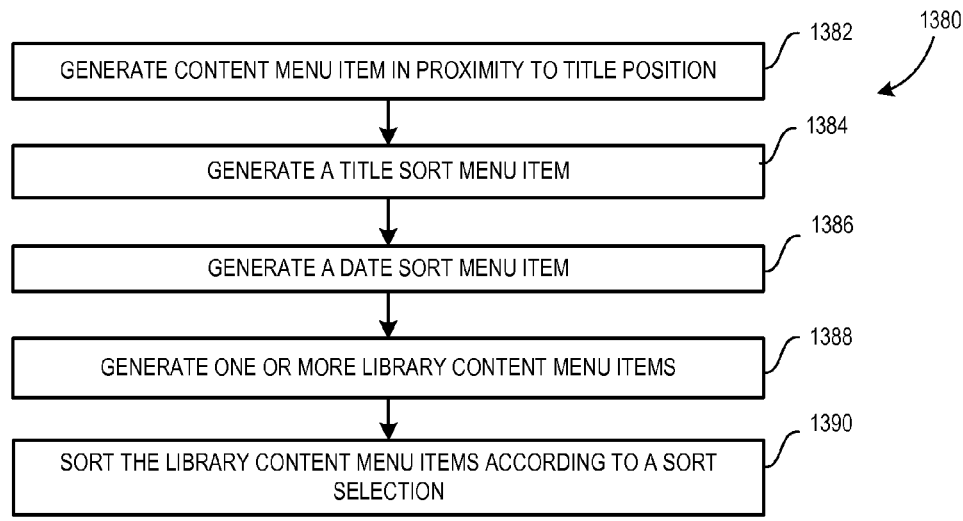
FIG. 38 is a flow diagram of an example process for sorting library menu items.

FIG. 38 is a flow diagram of an example process 1380 for sorting library menu items. In one example implementation, the processing device 104 and/or UI engine 114 and corresponding media engine 116 can perform operations to implement the process 1380.

Stage 1382 generates a content menu in proximity to a title position. For example, the processing device 104 and/or UI engine 114 and corresponding media engine 116 can generate a content menu in proximity to a title position, such as the content menu 802 shown in FIG. 28.

Stage 1384 generate a title sort menu item. For example, the processing device 104 and/or UI engine 114 and corresponding media engine 116 can generate a title sort menu item, such as the sort option 808 shown in FIG. 28.

Stage 1386 generates a date sort menu item. For example, the processing device 104 and/or UI engine 114 and corresponding media engine 116 can generate a date sort menu item, such as the sort option 810 shown in FIG. 28.

Stage 1388 generates one or more library content menu items. For example, the processing device 104 and/or UI engine 114 and corresponding media engine 116 can generate the library content menu items, such as the library content menu items 814-824 shown in FIG. 28.

Stage 1390 sorts the library content menu items according to a sort selection. For example, the processing device 104 and/or UI engine 114 and corresponding media engine 116 can sort the library content menu items according to s selection of either the title sort menu item or the date sort menu item, such as the sorted library content menu items 814-824 as shown in FIG. 28 or the sorted library content menu items 860-870 shown in FIG. 29.

The stages recited in the example processes of FIGS. 13-16 and 34-38 need not be performed in the example orders set forth.

Figure 39:
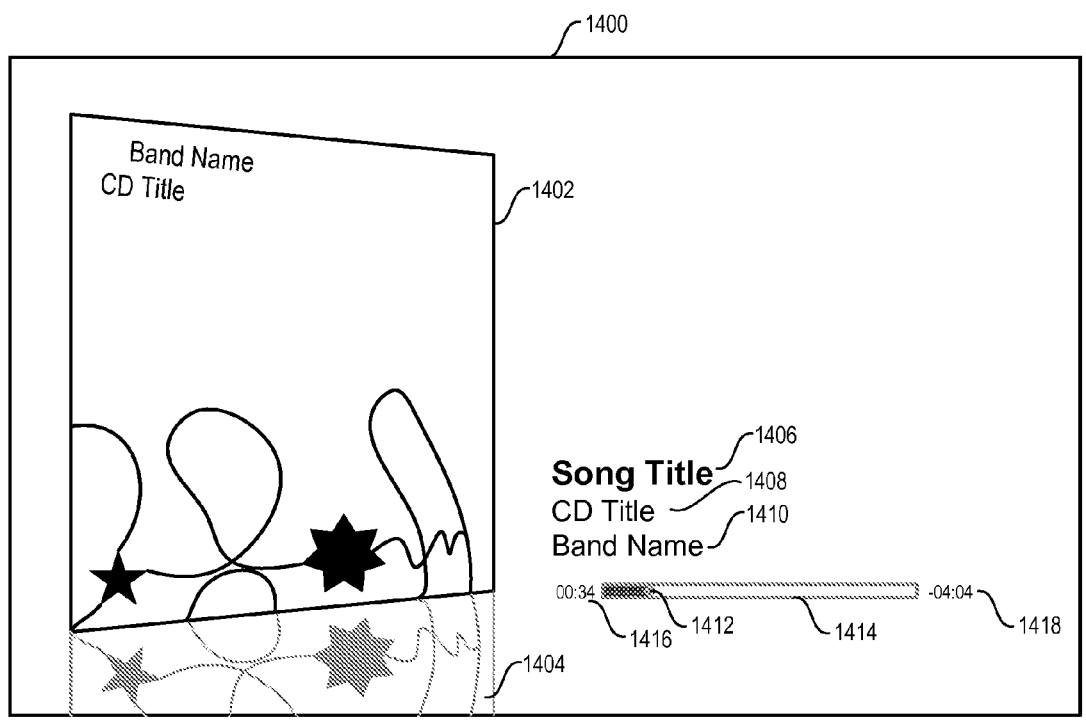
FIG. 39 is a diagram of an example media playback environment.

FIG. 39 is a diagram of an example media playback environment 1400. The example media playback environment 1400 can include a media abstraction 1042, such as an image of album cover art, and a corresponding reflection 1404 of the media abstraction 1042. During playback of corresponding content, e.g., a song, content metadata can be displayed, such as the song title 1406, the CD title 1406, and a band name 148. An example transport bar 1410 includes an position indicator 1412 that indicates an index related to the content playback. In the example implementation of FIG. 39, the index is a time index. To the left of the indicator 1412 the transport bar is shaded a first color, and to the right of the indicator the transport bar is shaded a second color. A first index field 1414 indicates the time elapsed, and a second index field 1416 indicates the time remaining.

The example implementations described herein can be implemented for various other media types and content. For example, access to and management of satellite radio programs, web blogs, syndicated media content, or other media types and content can be realized by the example implementation described herein.

The apparatus, methods, flow diagrams, and structure block diagrams described in this patent document may be implemented in computer processing systems including program code comprising program instructions that are executable by the computer processing system. Other implementations may also be used. Additionally, the flow diagram and structure block diagrams described herein, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
    generating a media menu interface comprising a plurality of media menu items;
    defining a plurality of media menu item positions in the media menu interface for the plurality of media menu items, each of the media menu item positions arranged along a one- dimensional path;
    highlighting with a highlight indicator a media menu item for selection;
    generating in the media menu interface a plurality of media menu item abstractions corresponding to the media menu items;
    defining a foreground position and a plurality of background positions in the media menu interface, each of the foreground position and background positions arranged along a multidimensional path separate from the one-dimensional path and being a position to which the media menu item abstractions transition according to the highlighted media menu item, and wherein the media menu item abstractions are displayed in the positions along the multidimensional path concurrently with the media menu items being displayed in the media menu item positions along the one-dimensional path;
    transitioning the media menu item abstractions into each of the background positions and the foreground position so that a media menu item abstraction corresponding to a-the highlighted media menu item transitions into the foreground position and after the transition is displayed in the foreground position, and media menu item abstractions corresponding to media menu items that are not highlighted transition into the background positions and after the transition are displayed in the background positions, wherein a media menu item abstraction is displayed in each of the foreground position and background positions after each transition, and a relative proximity of a media menu item to its corresponding media menu item abstraction changes in relation to a position of the highlight indicator relative to the menu item;
    receiving a selection of a highlighted media menu item; and
    transitioning a media menu item abstraction corresponding to the selected media menu item from the foreground position to a title position along the one-dimensional path, wherein after the media menu item abstraction has been transitioned into the title position the media menu item abstraction is displayed only in the title position and the media menu item abstractions corresponding to the media menu items that are not selected are not displayed;
    wherein transitioning a media menu item abstraction corresponding to the selected home menu item from the foreground position to a title position comprises:
    transitioning the media menu item abstraction from the foreground position to the title position along a path defining a beginning at the foreground position and a terminus at the title position; and
    reducing a size of the media menu abstraction as the media menu abstraction transitions from the foreground position to the title position.

2. The method of claim 1, comprising:
    blurring one or more of the media menu item abstractions in the background positions.

3. The method of claim 1, comprising:
    generating a content menu in proximity to the title position, the content menu comprising content menu items based on the selected media menu item, and wherein each of the content menu items are displayed in the media menu item positions arranged along the one-dimensional path; and
    concurrently displaying content abstractions with the content menu, the content abstractions displayed along another multidimensional path adjacent to the content menu items and corresponding to at least one of the content menu items.

4. The method of claim 3, wherein concurrently displaying content abstractions with the content menu comprises:
    generating content abstractions;
    defining the another multidimensional path having an ingress terminus and an egress terminus;
    emerging the content abstractions into the another multidimensional path at the ingress terminus;
    eliminating the content abstractions from the another multidimensional path at the egress terminus; and
    generating depth transitions of the content abstractions through the another multidimensional path from the ingress terminus to the egress terminus.

5. The method of claim 3, comprising:
    generating a sales content menu item associated with content offered for sale.

6. The method of claim 5, comprising:
    generating a list of content offered for sale in response to a selection of the sales content menu item.

7. The method of claim 6, comprising:
    generating a list of content offered for sale based on content sales metrics.

8. The method of claim 3, comprising:
    generating a preview content menu item associated with content.

9. The method of claim 8, comprising:
    generating a list of content previews available for preview in response to a selection of the preview content menu item.

10. The method of claim 1, wherein:
    the media menu item abstractions comprise one or more of a movie icon, a music icon, a video icon, and a broadcast icon.

11. The method of claim 4, wherein:
    the content abstractions comprises one of more of a movie still image, a cover art image, a video clip, or a program image.

12. The method of claim 10, wherein the selected media menu item is associated with the movie icon, the method comprising:
    generating a movie content menu in proximity to the title position, the movie content menu comprising a movie sale menu item, a preview menu item, and one or more library menu items; and
    generating movie abstractions corresponding to one or more of the movie sale menu item, the preview menu item, or one or more library menu item.

13. The method of claim 12, comprising:
    receiving a selection of the movie sale menu item;

generating a movie offer menu in proximity to the title position, the movie offer menu comprising movie offer menu items;

generating movie abstractions corresponding to the movie offer menu items; and generating depth transitions of the movie abstractions through another multidimensional path.

14. The method of claim 12, comprising:

receiving a selection of the preview menu item;

generating a preview menu in proximity to the title position, the preview menu comprising video previews;

generating movie abstractions corresponding to the preview menu items; and generating depth transitions of the movie abstractions through another multidimensional path.

15. The method of claim 12, comprising:

receiving a selection of the library menu items; and presenting a movie associated with the selected library menu item.

16. The method of claim 10, wherein the selected media menu item is associated with the music icon, the method comprising:

generating a music content menu in proximity to the title position, the music content menu comprising a music sale menu item, a shuffle menu item, and one or more category menu items; and generating music abstractions corresponding to one or more of the music sale menu item, the shuffle menu item, or one or more library menu item.

17. The method of claim 16, comprising:

receiving a selection of the music sale menu item;

generating a music offer menu in proximity to the title position, the music offer menu comprising music offer menu items;

generating music abstractions corresponding to the music offer menu items; and generating depth transitions of the music abstractions through another multidimensional path.

18. The method of claim 16, wherein:

the one or more library menu items comprise one or more of a music video category, a playlist category, and a songs category.

19. The method of claim 10, wherein the selected media menu item is associated with the broadcast icon, the method comprising:

generating a broadcast content menu in proximity to the title position, the broadcast content menu comprising broadcast library menu items;

generating a program sort menu item;

generating a date sort menu item; and generating one or more library menu items.

20. The method of claim 19, comprising:

receiving a selection of the date menu item; and sorting the library menu items according to an acquisition date.

21. The method of claim 19, comprising:

receiving a selection of the date menu item; and sorting the library menu items according to an episode order.

22. The method of claim 19, comprising:

receiving a selection of the program menu item; and sorting the library menu items according to program titles.

23. A computer readable medium storing instructions that are executable by a processing device, and upon such execution cause the processing device to perform operations comprising:

generating a home interface environment;

generating a home menu within the home interface environment, the home menu comprising a plurality of home menu items;

defining a plurality of home menu item positions for the plurality of home menu items, each of the home menu item positions arranged along a one-dimensional path;

providing a highlight indicator to highlight one of the home menu items for selection; generating in the home interface environment a plurality of home menu item abstractions corresponding to the home menu items;

defining a foreground position and a plurality of background positions in the home interface environment, each of the foreground position and background positions being a position to which the home menu item abstractions transition according to the highlighted home menu item, wherein the foreground position and the background positions are arranged along a multidimensional path separate from the one-dimensional path, the multidimensional path extending from a terminus, and wherein the home menu item abstractions are displayed in the positions along the multidimensional path concurrently with the home menu items being displayed in the media menu item positions along the one-dimensional path;

transitioning the home menu item abstractions into each of the foreground position and the background positions along the multidimensional path so that a home menu item abstraction corresponding to a highlighted home menu item transitions into the foreground position and is displayed in the foreground position after the transition, and each home menu item abstraction corresponding to a home menu item that is not highlighted transitions into a background position and is displayed in that background position after the transition, wherein a home menu item abstraction is displayed in each of the foreground position and background positions after each transition and a relative proximity of a home menu item to its corresponding home menu item abstraction changes in relation to a position of the highlight indicator relative to the home menu item;

receiving a selection of a home menu item; and transitioning a home menu item abstraction corresponding to the selected home menu item from the foreground position to a title position along the one-dimensional path, wherein after the home menu item abstraction has been transitioned into the title position the home menu item abstraction is displayed only in the title position and the home menu item abstractions corresponding to the home menu items that are not selected are not displayed;

wherein transitioning a home menu item abstraction corresponding to the selected home menu item from the foreground position to a title position along the one-dimensional path comprises:

transitioning the home menu item abstraction from the foreground position to the title position along a path defining a beginning at the foreground position and a terminus at the title position; and reducing a size of the media menu abstraction as the media menu abstraction transitions from the foreground position to the title position.

24. The computer readable medium of claim 23, storing further instructions that are executable by the processing device, and upon such execution cause the processing device to perform operations comprising:

blurring the home menu item abstractions in the background positions.

25. The computer readable medium of claim 23, storing further instructions that are executable by the processing device, and upon such execution cause the processing device to perform operations comprising:

changing the highlight indicator from the highlighted home menu item to another home menu item;

transitioning a home menu item abstraction corresponding to the another home menu item from a background position to the foreground position when the home menu item abstractions transition into the foreground position and the background positions in a first direction; and emerging a home menu item abstraction corresponding to the another home menu item into the foreground position when the home menu item abstractions transition into the foreground position and the background positions along the multidimensional path in a second direction.

26. The computer readable medium of claim 23, wherein: the home menu item abstractions comprise media icons.

27. The computer readable medium of claim 23, storing further instructions that are executable by the processing device, and upon such execution cause the processing device to perform operations comprising:

generating a content menu in proximity to the title position, the content menu comprising content menu items based on the selected home menu item, and wherein each of the content menu items are displayed in the home menu item positions arranged along the one-dimensional path; and concurrently displaying content abstractions with the content menu, the content abstractions displayed adjacent to the content menu items and corresponding to at least one of the content menu items.

28. The computer readable medium of claim 27, wherein concurrently displaying content abstractions with the content menu comprises:

generating content abstractions related to a highlighted content menu item;

defining the another multidimensional path having an ingress terminus and an egress terminus;

emerging the content abstractions into the another multidimensional path at the ingress terminus;

eliminating the content abstractions from the another multidimensional path at the egress terminus; and generating depth transitions of the content abstractions through the another multidimensional path from the ingress terminus to the egress terminus.

29. The computer readable medium of claim 28, storing further instructions that are executable by the processing device, and upon such execution cause the processing device to perform operations comprising:

generating overlapping depth transitions of the content abstractions through the another multidimensional path from the ingress terminus to the egress terminus.

30. The computer readable medium of claim 26, wherein: the media icons comprise one or more of a movie content icon, a music content icon, a video content icon, and a broadcast content icon.

31. The computer readable medium of claim 28, wherein: the content abstractions comprises one of more of a movie still image, a cover art image, a video clip, or a program image.

32. The computer readable medium of claim 27, storing further instructions that are executable by the processing device, and upon such execution cause the processing device to perform operations comprising:

generating a sales content menu item associated with content offered for sale.

33. The computer readable medium of claim 32, storing further instructions that are executable by the processing device, and upon such execution cause the processing device to perform operations comprising:

generate a list of content offered for sale in response to a selection of the sales content menu item.

34. The computer readable medium of claim 33, wherein: the list of content offered for sale is based on content sales metrics.

35. The method of claim 1, wherein transitioning a media menu item abstraction corresponding to the selected media menu item from the foreground position to a title position along the one-dimensional path further comprises transitioning the media menu item abstractions corresponding to the media menu items that are not selected out of the media menu interface along the multidimensional path so that the media menu items that are not selected are not displayed.

36. The computer readable medium of claim 33, wherein transitioning a home menu item abstraction corresponding to the selected home menu item from the foreground position to a title position along the one-dimensional path further comprises transitioning the home menu item abstractions corresponding to the home menu items that are not selected out of the home interface environment along the multidimensional path so that the home menu items that are not selected are not displayed.

\* \* \* \* \*

UNITED STATES PATENT AND TRADEMARK OFFICE
CERTIFICATE OF CORRECTION

| | | |
|---|---|---|
| PATENT NO. | : 7,930,650 B2 | Page 1 of 4 |
| APPLICATION NO. | : 11/530834 | |
| DATED | : April 19, 2011 | |
| INVENTOR(S) | : Rainer Brodersen et al. | |

It is certified that error appears in the above-identified patent and that said Letters Patent is hereby corrected as shown below:

Title page, Item (75), in column 1, in "Inventors", line 4-5, delete "Los Gratos," and insert -- Los Gatos, --, therefor.

In column 1, line 10, delete "platers," and insert -- players, --, therefor.

In column 1, line 17, delete "are accessible. The user" and insert -- that are typically --, therefor.

In column 1, line 34, delete "men" and insert -- menu --, therefor.

In column 1, line 44, delete "MENU" and insert -- menu --, therefor.

In column 1, line 56, delete "digram" and insert -- diagram --, therefor.

In column 2, line 23, delete "FIG. 17-20" and insert -- FIGS. 17-20 --, therefor.

In column 2, line 25, delete "digrams" and insert -- diagrams --, therefor.

In column 2, line 53, delete "digram" and insert -- diagram --, therefor.

In column 2, line 53-54, delete "sorting library menu items." and insert -- displaying content abstractions. --, therefor.

In column 3, line 9, delete "input//output" and insert -- input/output --, therefor.

In column 3, line 21, delete "textural" and insert -- textual --, therefor.

In column 3, line 26, delete "manges" and insert -- manages --, therefor.

In column 3, line 49, delete "use" and insert -- user --, therefor.

In column 3, line 67, delete "116-i n." and insert -- 116-n. --, therefor.

In column 4, line 5, delete "line," and insert -- link, --, therefor.

In column 4, line 16, delete "116-1-116n." and insert -- 116-1-116-n. --, therefor.

In column 4, line 17, delete "manges" and insert -- manages --, therefor.

In column 4, line 18-19, delete "116-1-116n" and insert -- 116-1-116-n --, therefor.

In column 4, line 46, delete "finer" and insert -- finger --, therefor.

In column 4, line 50, delete "coordinates" and insert -- coordinates, --, therefor.

Signed and Sealed this
Eighth Day of November, 2011

David J. Kappos
*Director of the United States Patent and Trademark Office*

CERTIFICATE OF CORRECTION (continued)
U.S. Pat. No. 7,930,650 B2

In column 4, line 52, delete "164, 164," and insert -- 162, 164, --, therefor.

In column 4, line 54, before "area" delete "include a menu".

In column 4, line 65, delete "10." and insert -- 110. --, therefor.

In column 5, line 8, delete "an" and insert -- can --, therefor.

In column 5, line 8, delete "an" and insert -- can --, therefor.

In column 5, line 23, delete "FIG. 2" and insert -- FIG. 1 --, therefor.

In column 5, line 54, delete "121." and insert -- 212. --, therefor.

In column 6, line 14, delete ""Pdcasts, "" and insert -- "Podcasts," --, therefor.

In column 6, line 48, delete "shard" and insert -- shared --, therefor.

In column 6, line 50, delete "or" and insert -- for --, therefor.

In column 6, line 57, delete "tone" and insert -- one --, therefor.

In column 7, line 28, delete "media" and insert -- media menu --, therefor.

In column 7, line 40, delete "30" and insert -- 330 --, therefor.

In column 8, line 9, delete ""fly-by"" and insert -- "fly by" --, therefor.

In column 8, line 10, delete "form" and insert -- from --, therefor.

In column 8, line 23, delete "32." and insert -- 324. --, therefor.

In column 8, line 36, after "out" insert -- of --.

In column 8, line 53, delete "One" and insert -- Once --, therefor.

In column 8, line 57, delete "one" and insert -- on --, therefor.

In column 9, line 49, after "out" insert -- of --.

In column 10, line 34, delete "implantation," and insert -- implementation, --, therefor.

In column 10, line 66, delete "State" and insert -- Stage --, therefor.

In column 10, line 67, delete "Fore" and insert -- For --, therefor.

In column 11, line 4, after "icon" insert -- in --.

In column 11, line 25, delete "Fore" and insert -- For --, therefor.

In column 13, line 19-20, delete ""Movies,"" and insert -- "Movies." --, therefor.

In column 13, line 31, delete "Presents, "" and insert -- Presents," --, therefor.

In column 13, line 57, delete "Fore" and insert -- For --, therefor.

In column 14, line 3, delete "633" and insert -- 633, --, therefor.

In column 14, line 13, delete "168," and insert -- 618, --, therefor.

In column 14, line 17, delete "move" and insert -- movie --, therefor.

In column 14, line 63, delete "rat" and insert -- rate --, therefor.

In column 14, line 64, delete "652." and insert -- 653. --, therefor.

In column 15, line 10, delete "643." and insert -- 653. --, therefor.

In column 15, line 19, delete "651," and insert -- 651. --, therefor.

CERTIFICATE OF CORRECTION (continued)
U.S. Pat. No. 7,930,650 B2

In column 15, line 24, delete "Fore" and insert -- For --, therefor.

In column 15, line 41, delete "at" and insert -- at approximately 60% of full scale; the content abstraction 632 can be displayed at --, therefor.

In column 15, line 51, after "positioned" insert -- at --.

In column 16, line 10, delete "s" and insert -- a --, therefor.

In column 16, line 11, delete "i Tunes" and insert -- iTunes --, therefor.

In column 16, line 11, delete "Present" and insert -- Presents --, therefor.

In column 16, line 52, delete "and/r" and insert -- and/or --, therefor.

In column 17, line 40, delete ""Cars,"" and insert -- "Cars." --, therefor.

In column 17, line 61-62, delete "pray be" and insert -- part by --, therefor.

In column 17, line 65, delete "184," and insert -- 814, --, therefor.

In column 18, line 13, delete "FOG. 29." and insert -- FIG. 29. --, therefor.

In column 18, line 45, delete "Fore" and insert -- For --, therefor.

In column 18, line 46, delete "820," and insert -- 830, --, therefor.

In column 19, line 35, delete ""Present,"" and insert -- "Presents," --, therefor.

In column 19, line 55, delete "ore" and insert -- or --, therefor.

In column 19, line 56, delete ""Albums."" and insert -- "Albums," --, therefor.

In column 19, line 61, delete ""Books, "" and insert -- "Books," --, therefor.

In column 19, line 66, delete "920," and insert -- 930, --, therefor.

In column 20, line 4, delete "920," and insert -- 930, --, therefor.

In column 20, line 10, delete "920," and insert -- 930, --, therefor.

In column 20, line 11, delete "937," and insert -- 935, --, therefor.

In column 20, line 15, after "example" insert -- content menu interface environment 900 of FIG. 30, for example, a first set of content --.

In column 21, line 42, delete "effect, Fore" and insert -- effect. For --, therefor.

In column 21, line 49, delete "with" and insert -- within --, therefor.

In column 21, line 51, delete "FOG. 31," and insert -- FIG. 31, --, therefor.

In column 21, line 54, delete "egress" and insert -- ingress terminus 1051 and are eliminated from the multidimensional path 1050 at the egress --, therefor.

In column 21, line 63, delete "form" and insert -- from --, therefor.

In column 22, line 13, delete "x-and" and insert -- x- and --, therefor.

In column 22, line 15, delete "below;" and insert -- below: --, therefor.

In column 22, line 30, delete "z-axis" and insert -- x-axis --, therefor.

In column 22, line 50, delete "counterclockwise," and insert -- counterclockwise; --, therefor.

In column 23, line 1, delete "form" and insert -- from --, therefor.

In column 23, line 3, delete "form" and insert -- from --, therefor.

In column 23, line 15, delete "other" and insert -- another --, therefor.

In column 23, line 33, delete "processing" and insert -- processing resources associated with content abstractions that have transitioned beyond position 1126. --, therefor.

In column 23, line 49, delete "by" and insert -- be --, therefor.

In column 23, line 65, delete "corresponding," and insert -- corresponding --, therefor.

In column 23, line 65, delete "1201" and insert --1210 --, therefor.

In column 24, line 13, delete "State" and insert -- Stage --, therefor.

In column 24, line 35, delete "332-226" and insert -- 332-336 --, therefor.

In column 24, line 50, before "title" delete "proximity to the". (Second occurrence)

In column 24, line 52, delete "at" and insert -- a --, therefor.

In column 24, line 56, delete "aberrations." and insert -- abstractions. --, therefor.

In column 24, line 62, delete "Fore" and insert -- For --, therefor.

In column 25, line 41, after "to" insert -- a --.

In column 26, line 11, delete "generate" and insert -- generates --, therefor.

In column 26, line 27, delete "s" and insert -- a --, therefor.

In column 26, line 37, delete "1042," and insert -- 1402, --, therefor.

In column 26, line 39, delete "1042." and insert -- 1402. --, therefor.

In column 26, line 41, delete "1406," and insert -- 1408, --, therefor.

In column 27, line 17, in claim 1, delete "one- dimensional" and insert -- one-dimensional --, therefor.

In column 27, line 37, in claim 1, delete "a-the" and insert -- the --, therefor.

In column 28, line 53, in claim 11, delete "one of" and insert -- one or --, therefor.

In column 32, line 11, in claim 31, delete "one of" and insert -- one or --, therefor.